US012794534B2

(12) United States Patent
Duan et al.

(10) Patent No.: US 12,794,534 B2
(45) Date of Patent: Nov. 10, 2026

(54) ADAPTIVE RF SENSING AIDED WITH REAL-TIME NON-RF MEASUREMENTS

(71) Applicant: QUALCOMM Incorporated, San Diego, CA (US)

(72) Inventors: Weimin Duan, San Diego, CA (US); Fei Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 18/958,777

(22) Filed: Nov. 25, 2024

(65) Prior Publication Data

US 2025/0088252 A1 Mar. 13, 2025

Related U.S. Application Data

(63) Continuation of application No. 18/503,057, filed on Nov. 6, 2023, now Pat. No. 12,191,959, which is a continuation of application No. 17/650,503, filed on Feb. 9, 2022, now Pat. No. 11,863,273.

(51) Int. Cl.

| | |
|---|---|
| ***H04L 5/12*** | (2006.01) |
| ***H04B 7/0426*** | (2017.01) |
| ***H04B 7/06*** | (2006.01) |
| ***H04L 1/1812*** | (2023.01) |
| ***H04L 5/00*** | (2006.01) |

(52) U.S. Cl.

CPC ........... *H04B 7/0639* (2013.01); *H04B 7/043* (2013.01); *H04L 1/1816* (2013.01); *H04L 5/0007* (2013.01)

(58) Field of Classification Search

CPC ..... H04B 7/0639; H04B 7/043; H04L 1/1816; H04L 5/0007

USPC ................ 375/262, 261, 259, 219, 295, 316

See application file for complete search history.

(56) References Cited

U.S. PATENT DOCUMENTS

| | | | | |
|---|---|---|---|---|
| 11,863,273 | B2 | 1/2024 | Duan et al. | |
| 2019/0260455 | A1* | 8/2019 | Ryu ..................... | H04B 7/0695 |
| 2020/0319301 | A1 | 10/2020 | Qiu et al. | |

(Continued)

FOREIGN PATENT DOCUMENTS

| | | | |
|---|---|---|---|
| WO | 2020216522 | A1 | 10/2020 |
| WO | 2021173213 | A1 | 9/2021 |

OTHER PUBLICATIONS

International Preliminary Report on Patentability—PCT/US2022/052014—The International Bureau of WIPO—Geneva, Switzerland—Aug. 22, 2024.

(Continued)

*Primary Examiner* — Zewdu A Kassa

(74) *Attorney, Agent, or Firm* — Procopio, Cory, Hargreaves & Savitch LLP

(57) ABSTRACT

Aspects presented may enable RF sensing to be adaptive to the environment to improve the sensing, performance, and/or the spectrum efficiency of cellular systems and the power efficiency of RF sensing nodes. In one aspect, an RF sensing node extracts one or more features for a set of objects of an area via at least one non-RF sensor. The RF sensing node transmits, to a network entity, the one or more features or at least one non-RF measurement derived from the one or more features. The RF sensing node receives, from the network entity, an RRS transmission configuration derived based on the one or more features or the at least one non-RF measurement transmitted to the network entity.

16 Claims, 16 Drawing Sheets

(56) References Cited

U.S. PATENT DOCUMENTS

| | | | | |
|---|---|---|---|---|
| 2021/0293927 | A1 | 9/2021 | Tyagi et al. | |
| 2023/0035010 | A1* | 2/2023 | Kalkunte | G01S 13/42 |
| 2023/0076874 | A1 | 3/2023 | Jeon et al. | |
| 2023/0096496 | A1* | 3/2023 | Shin | G06V 20/56<br>381/56 |
| 2023/0308156 | A1 | 9/2023 | Duan et al. | |
| 2024/0088972 | A1 | 3/2024 | Duan | |

OTHER PUBLICATIONS

International Search Report and Written Opinion—PCT/US2022/052014—ISA/EPO—May 15, 2023.

* cited by examiner

500B

500A

ADAPTIVE RF SENSING AIDED WITH REAL-TIME NON-RF MEASUREMENTS

CROSS-REFERENCE TO RELATED APPLICATIONS

This application is a Continuation of U.S. application Ser. No. 18/503,057, entitled "ADAPTIVE RF SENSING AIDED WITH REAL-TIME NON-RF MEASUREMENTS" and filed on Nov. 6, 2023, which is a continuation of U.S. application Ser. No. 17/650,503, entitled "ADAPTIVE RF SENSING AIDED WITH REAL-TIME NON-RF MEASUREMENTS" and filed on Feb. 9, 2022. The disclosures of the aforementioned applications are expressly incorporated by reference herein in their entireties.

TECHNICAL FIELD

The present disclosure relates generally to communication systems, and more particularly, to radio frequency (RF) sensing.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some communication systems may also support a number of cellular network-based positioning technologies, where the geographic location of a wireless device may be determined based on measuring radio signals exchanged between the wireless device and other wireless devices. For example, a distance between a wireless device and a transmission reception point (TRP) may be estimated based on the time it takes for a reference signal (e.g., a positioning reference signal (PRS)) transmitted from the TRP to reach the wireless device. Other examples of cellular network-based positioning technologies may include downlink-based, uplink-based, downlink-and-uplink-based, and/or radio frequency (RF) sensing-based positioning methods.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus extracts one or more features for a set of objects of an area via at least one non-radio frequency (non-RF) sensor. The apparatus transmits, to a network entity, the one or more features or at least one non-RF measurement derived from the one or more features. The apparatus receives, from the network entity, a radar reference signal (RRS) transmission configuration derived based on the one or more features or the at least one non-RF measurement transmitted to the network entity.

In another aspect of the disclosure, a method, a computer-readable medium, and an apparatus are provided. The apparatus receives, from an RF sensing node, one or more features for a set of objects of an area or at least one non-RF measurement derived from the one or more features. The apparatus transmits, to the RF sensing node, an RRS transmission configuration derived based on the one or more features or the at least one non-RF measurement received from the RF sensing node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
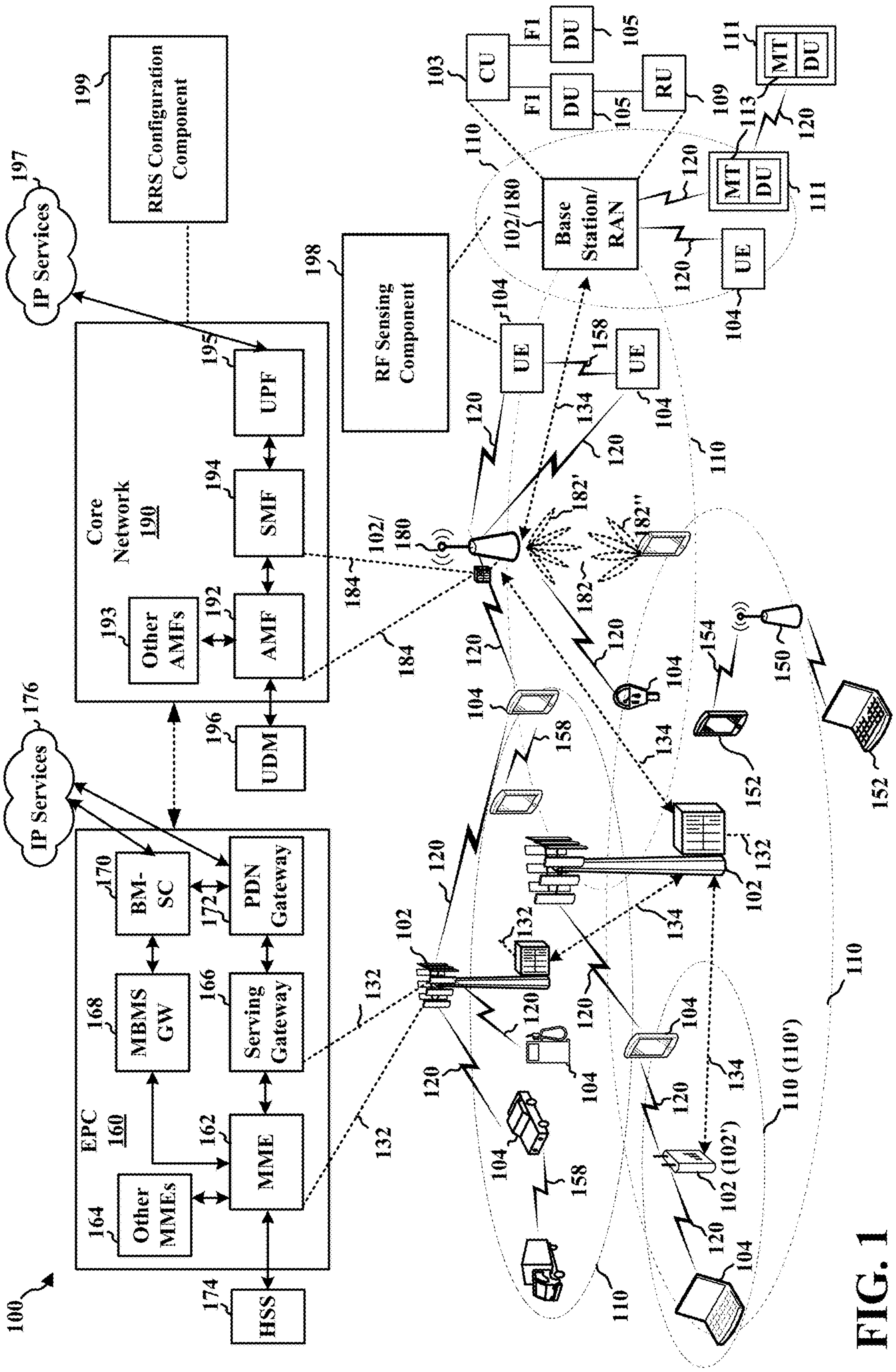
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may improve the performance and the accuracy for RF sensing. Aspects presented may enable RF sensing to be adaptive to the environment to improve the sensing, performance, and/or the spectrum efficiency of cellular systems and the power efficiency of RF sensing nodes (e.g., base station and/or UE). For example, in one aspect of the present disclosure, if a network is able to determine the direction of a target, the network may guide an RF sensing node (or a radar transmission (Tx)) to beamform toward the target to enhance the Signal-to-noise ratio (SNR). In another example, if a network is able to determine that there is no small object to be sensed, the network may reduce the Tx power and/or the waveform repetitions of an RF sensing node to achieve power saving. In some examples, one or more features (e.g., parameters to be reported to a network to enable adaptive RF sensing) may be extracted/derived based on non-RF method(s), such as via a camera, an ultra-sound sensor, a lidar sensor, and/or a barometric sensor, etc. The non-RF based feature extraction/derivation may be implemented on an RF sensing node based on a real-time setting. Also, the non-RF based feature extraction/derivation may have less interference issue(s) compared with RF based feature extraction/derivation.

In certain aspects, an RF sensing node, which may be a UE 104 or a base station 102/180, may include an RF sensing component 198 configured to transmit RRS based at least in part on environmental conditions to improve the performance and the accuracy of RF sensing. In one configuration, the RF sensing component 198 may be configured to extract one or more features for a set of objects of an area via at least one non-RF sensor. In such configuration, the RF sensing component 198 may transmit, to a network entity, the one or more features or at least one non-RF measurement derived from the one or more features. In such configuration, the RF sensing component 198 may receive, from the network entity, an RRS transmission configuration derived based on the one or more features or the at least one non-RF measurement transmitted to the network entity.

In certain aspects, a network entity, which may be a server for sensing, a location server, or an LMF, may include an RRS configuration component 199 configured to configure RRS transmission for an RF sensing node based at least in part on environmental conditions around the RF sensing node to improve the performance and the accuracy of RF sensing. In one configuration, the RRS configuration component 199 may be configured to receive, from an RF sensing node, one or more features for a set of objects of an area or at least one non-RF measurement derived from the one or more features. In such configuration, the RRS configuration component 199 may transmit, to the RF sensing node, an RRS transmission configuration derived based on the one or more features or the at least one non-RF measurement received from the RF sensing node.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station 102 or 180 may be referred as a RAN and may include aggregated or disaggregated components. As an example of a disaggregated RAN, a base station may include a central unit (CU) 103, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 103, the DU 105, and the RU 109. A RAN may be disaggregated with a split between the CU 103 and an aggregated DU/RU. The CU 103 and the one or more DUs 105 may be connected via an F1 interface. A DU 105 and an RU 109 may be connected via a fronthaul interface. A connection between the CU 103 and a DU 105 may be referred to as a midhaul, and a connection between a DU 105 and an RU 109 may be referred to as a fronthaul. The connection between the CU 103 and the core network may be referred to as the backhaul. The RAN may be based on a functional split between various components of the RAN, e.g., between the CU 103, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 103 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 103 and a DU 105. IAB nodes 111 may include a DU 105 and a mobile termination (MT) 113. The DU 105 of an IAB node 111 may operate as a parent node, and the MT 113 may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2A:
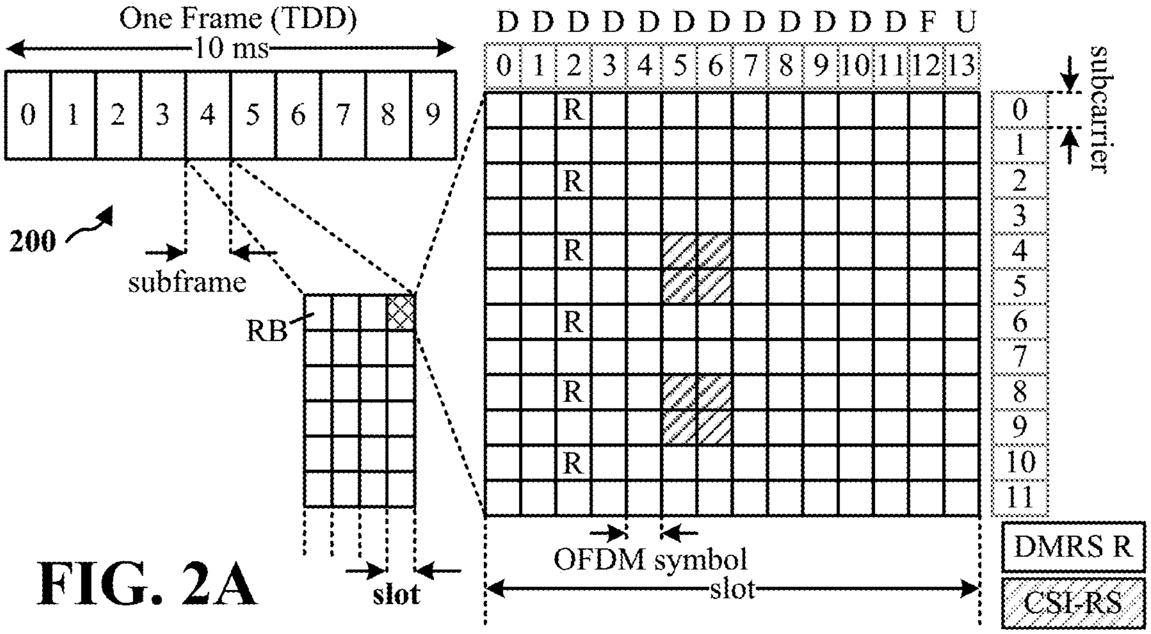
FIG. 2A is a diagram illustrating an example of a first frame, in accordance with various aspects of the present disclosure.
Figure 2B:
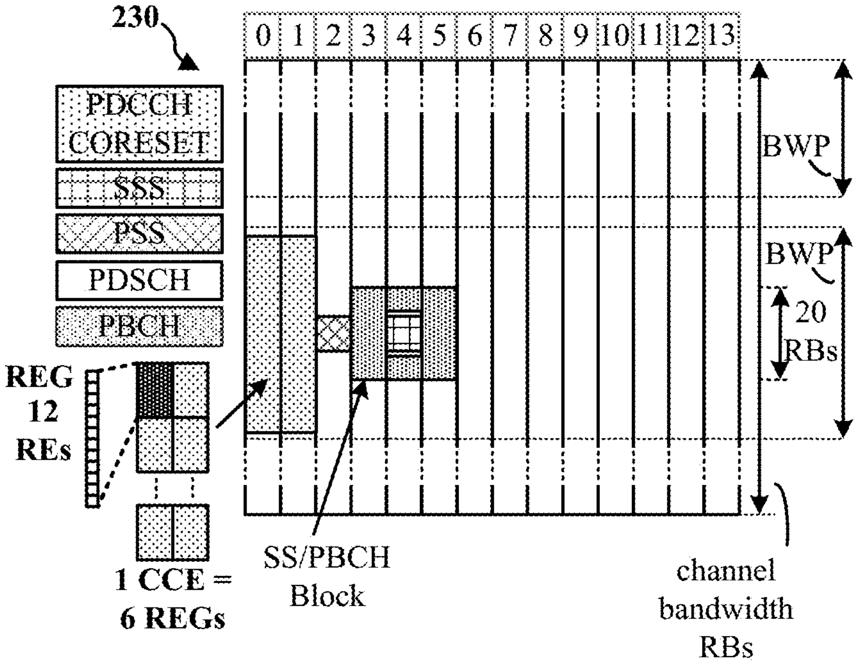
FIG. 2B is a diagram illustrating an example of DL channels within a subframe, in accordance with various aspects of the present disclosure.
Figure 2C:
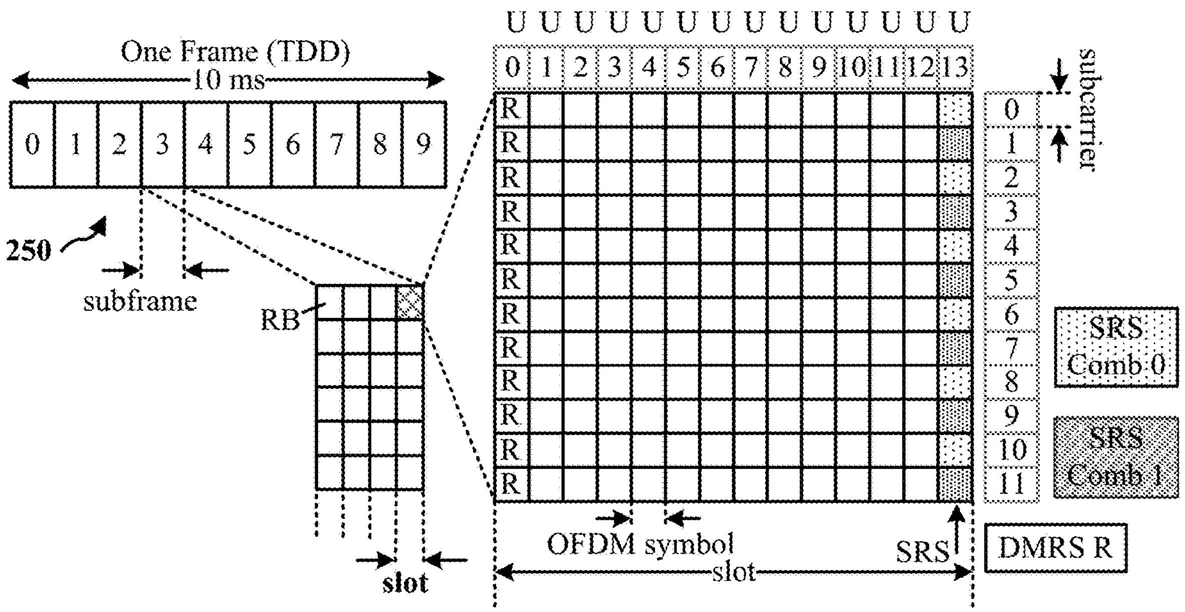
FIG. 2C is a diagram illustrating an example of a second frame, in accordance with various aspects of the present disclosure.
Figure 2D:
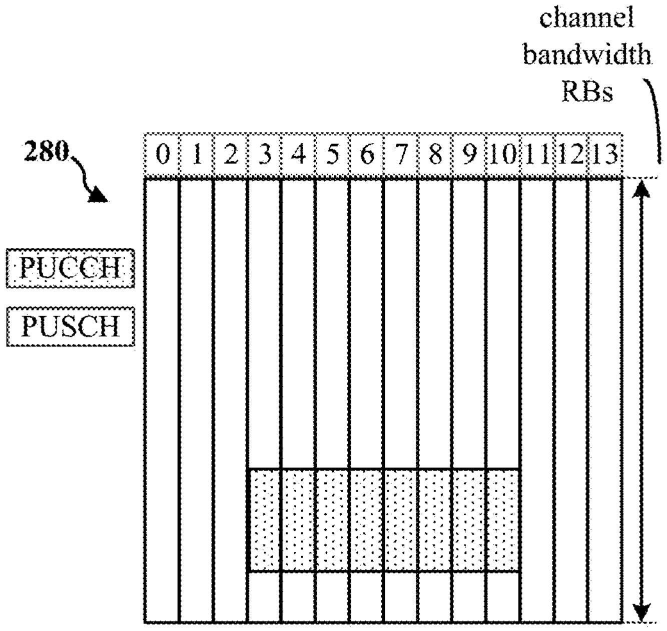
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 24 slots/subframe. The subcarrier spacing may be equal to 24*15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
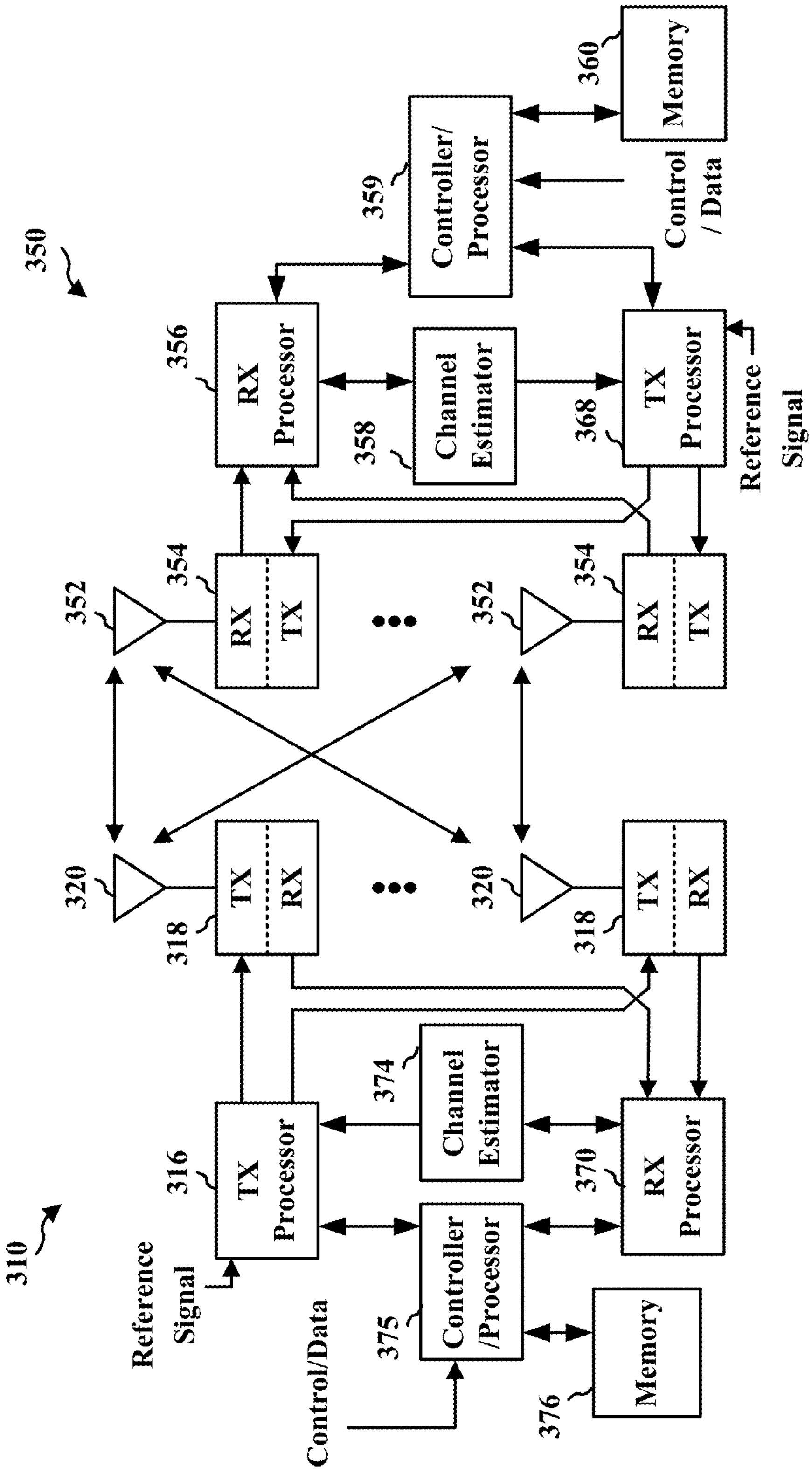
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some examples, at least one of the TX processor 368, the RX processor 356, and the controller/processor 359 may be configured to perform aspects in connection with the RF sensing component 198 of FIG. 1. In other examples, at least one of the TX processor 316, the RX processor 370, and the controller/processor 375 may be configured to perform aspects in connection with the RF sensing component 198 of FIG. 1.

A network may support a number of cellular network-based positioning technologies, such as downlink-based, uplink-based, and/or downlink-and-uplink-based positioning methods. Downlink-based positioning methods may include an observed time difference of arrival (OTDOA) (e.g., in LTE), a downlink time difference of arrival (DL-TDOA) (e.g., in NR), and/or a downlink angle-of-departure (DL-AoD) (e.g., in NR). In an OTDOA or DL-TDOA positioning procedure, a UE may measure the differences between each time of arrival (ToA) of reference signals (e.g., positioning reference signals (PRSs)) received from pairs of base stations, referred to as reference signal time difference (RSTD) measurements or time difference of arrival (TDOA) measurements, and report them to a positioning entity (e.g., a location management function (LMF)). For example, the UE may receive identifiers (IDs) of a reference base station (which may also be referred to as a reference cell or a reference gNB) and at least one non-reference base station in assistance data (AD). The UE may then measure the RSTD between the reference base station and each of the non-reference base stations. Based on the known locations of the involved base stations and the RSTD measurements, the positioning entity may estimate a location of the UE. In other words, a position of the UE may be estimated based on measuring reference signals transmitted between the UE and one or more base stations and/or transmission-reception points (TRPs) of the one or more base stations. As such, the PRSs may enable UEs to detect and measure neighbor TRPs, and to perform positioning based on the measurement. For purposes of the present disclosure, the suffixes "-based" and "-assisted" may refer respectively to the node that is responsible for making the positioning calculation (and which may also provide measurements) and a node that provides measurements (but which may not make the positioning calculation). For example, an operation in which measurements are provided by a UE to a base station/positioning entity to be used in the computation of a position estimate may be described as "UE-assisted," "UE-assisted positioning," and/or "UE-assisted position calculation" while an operation in which a UE computes its own position may be described as "UE-based," "UE-based positioning," and/or "UE-based position calculation."

In some examples, the term "TRP" may refer to one or more antennas of a base station whereas the term "base station" may refer to a complete unit (e.g., the base station 102/180) that includes aggregated or disaggregated components, such as described in connection with FIG. 1. For example, as an example of a disaggregated RAN, a base station may include CU, one or more DUs, one or more RUs, and/or one or more TRPs. One or more disaggregated components may be located at different locations. For example, different TRPs may be located at different geographic locations. In another example, a TRP may refer to a set of geographically co-located antennas (e.g., antenna array (with one or more antenna elements)) supporting transmission point (TP) and/or reception point (RP) functionality. Thus, a base station may transmit signal to and/or receive signal from other wireless device (e.g., a UE, another base station, etc.) via one or more TRPs. For purposes of the present disclosure, in some examples, the term "TRP" may be used interchangeably with the term "base station."

For DL-AoD positioning, the positioning entity may use a beam report from the UE of received signal strength measurements of multiple downlink transmit beams to determine the angle(s) between the UE and the transmitting base station(s). The positioning entity may then estimate the location of the UE based on the determined angle(s) and the known location(s) of the transmitting base station(s).

Uplink-based positioning methods may include UL-TDOA and UL-AoA. UL-TDOA is similar to DL-TDOA, but is based on uplink reference signals (e.g., sounding reference signals (SRSs)) transmitted by the UE. For UL-AoA positioning, one or more base stations may measure the received signal strength of one or more uplink reference signals (e.g., SRSs) received from a UE on one or more uplink receive beams. The positioning entity may use the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods may include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or a base station), which transmits an RTT response signal (e.g., an SRS or a PRS) back to the initiator. The RTT response signal may include the difference between the ToA of the RTT measurement signal and the transmission time of the RTT response signal, referred to as the reception-to-transmission (Rx-Tx) time difference. The initiator may calculate the difference between the transmission time of the RTT measurement signal and the ToA of the RTT response signal, referred to as the transmission-to-reception (Tx-Rx) time difference. The propagation time (also referred to as the "time of flight") between the initiator and the responder may be calculated from the Tx-Rx and Rx-Tx time differences. Based on the propagation time and the known speed of light, the distance between the initiator and the responder may be determined. For multi-RTT positioning, a UE may perform an RTT procedure with multiple base stations to enable its location to be determined (e.g., using multilateration) based on the known locations of the base stations. RTT and multi-RTT methods may be combined with other positioning techniques, such as UL-AoA and DL-AoD, to improve location accuracy.

The E-CID positioning method may be based on radio resource management (RRM) measurements. In E-CID, the UE may report the serving cell ID and the timing advance (TA), as well as the identifiers, estimated timing, and signal strength of detected neighbor base stations. The location of the UE is then estimated based on this information and the known locations of the base station(s).

To assist positioning operations, a location server (e.g., an LMF, or an SLP) may provide assistance data (AD) to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations (e.g., in periodically broadcasted overhead messages, etc.). In some cases, the UE may be able to detect neighbor network nodes without the use of assistance data.

In the case of an OTDOA or DL-TDOA positioning procedure, the assistance data may further include an expected RSTD value and an associated uncertainty (e.g., a search space window) around the expected RSTD. In some cases, the value range of the expected RSTD may be plus-minus (+/−) 500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs. In this context, "RSTD" may refer to one or more measurements indicative of a difference in time of arrival between a PRS transmitted by a base station, referred to herein as a "neighbor base station" or a "measuring base station," and a PRS transmitted by a reference base station. A reference base station may be selected by a location server and/or by a UE to provide good or sufficient signal strength observed at a UE, such that a PRS may be more accurately and/or more quickly acquired and/or measured, such as without any special assistance from a serving base station.

A location estimate may also be referred to as a position estimate, location, position, position fix, fix, or the like. A location estimate may be geodetic and include coordinates (e.g., latitude, longitude, and possibly altitude) or may be civic and include a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence). For purposes of the present disclosure, reference signals may include PRS, tracking reference signals (TRS), phase tracking reference signals (PTRS), cell-specific reference signals (CRS), CSI-RS, demodulation reference signals (DMRS), PSS, SSS, SSBs, SRS, etc., depending on whether the illustrated frame structure is used for uplink or downlink communication. In some examples, a collection of resource elements (REs) that are used for transmission of PRS may be referred to as a "PRS resource." The collection of resource elements may span multiple PRBs in the frequency domain and one or more consecutive symbol(s) within a slot in the time domain. In a given OFDM symbol in the time domain, a PRS resource may occupy consecutive PRBs in the frequency domain. In other examples, a "PRS resource set" may refer to a set of PRS resources used for the transmission of PRS signals, where each PRS resource may have a PRS resource ID. In addition, the PRS resources in a PRS resource set may be associated with a same TRP. A PRS resource set may be identified by a PRS resource set ID and may be associated with a particular TRP (e.g., identified by a TRP ID). In addition, the PRS resources in a PRS resource set may have a same periodicity, a common muting pattern configuration, and/or a same repetition factor across slots. The periodicity may be a time from a first repetition of a first PRS resource of a first PRS instance to the same first repetition of the same first PRS resource of the next PRS instance. For example, the periodicity may have a length selected from $2^\mu*\{4, 5, 8, 10, 16, 20, 32, 40, 64, 80, 160, 320, 640, 1280, 2560, 5120, 10240\}$ slots, where $\mu=0, 1, 2, 3$. The repetition factor may have a length selected from $\{1, 2, 4, 6, 8, 16, 32\}$ slots. A PRS resource ID in a PRS resource set may be associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." In some examples, a "PRS instance" or "PRS occasion" may be one instance of a periodically repeated time window (such as a group of one or more consecutive slots) where PRS are expected to be transmitted. A PRS occasion also may be referred to as a "PRS positioning occasion," a "PRS positioning instance," a "positioning occasion," "a positioning instance," a "positioning repetition," or simply an "occasion," an "instance," and/or a "repetition," etc.

A positioning frequency layer (PFL) (which may also be referred to as a "frequency layer") may be a collection of one or more PRS resource sets across one or more TRPs that have the same values for certain parameters. Specifically, the collection of PRS resource sets may have a same subcarrier spacing and cyclic prefix (CP) type (e.g., meaning all numerologies supported for PDSCHs are also supported for PRS), the same Point A, the same value of the downlink PRS bandwidth, the same start PRB (and center frequency), and/or the same comb-size, etc. The Point A parameter may take the value of a parameter ARFCN-ValueNR (where "ARFCN" stands for "absolute radio-frequency channel number") and may be an identifier/code that specifies a pair of physical radio channel used for transmission and reception. In some examples, a downlink PRS bandwidth may have a granularity of four PRBs, with a minimum of 24 PRBs and a maximum of 272 PRBs. In other examples, up to four frequency layers may be configured, and up to two PRS resource sets may be configured per TRP per frequency layer.

The concept of a frequency layer may be similar to a component carrier (CC) and a BWP, where CCs and BWPs may be used by one base station (or a macro cell base station and a small cell base station) to transmit data channels, while frequency layers may be used by multiple (e.g., three or more) base stations to transmit PRS. A UE may indicate the number of frequency layers it is capable of supporting when the UE sends the network its positioning capabilities, such as during a positioning protocol session. For example, a UE may indicate whether it is capable of supporting one or four PFLs.

Figure 4:
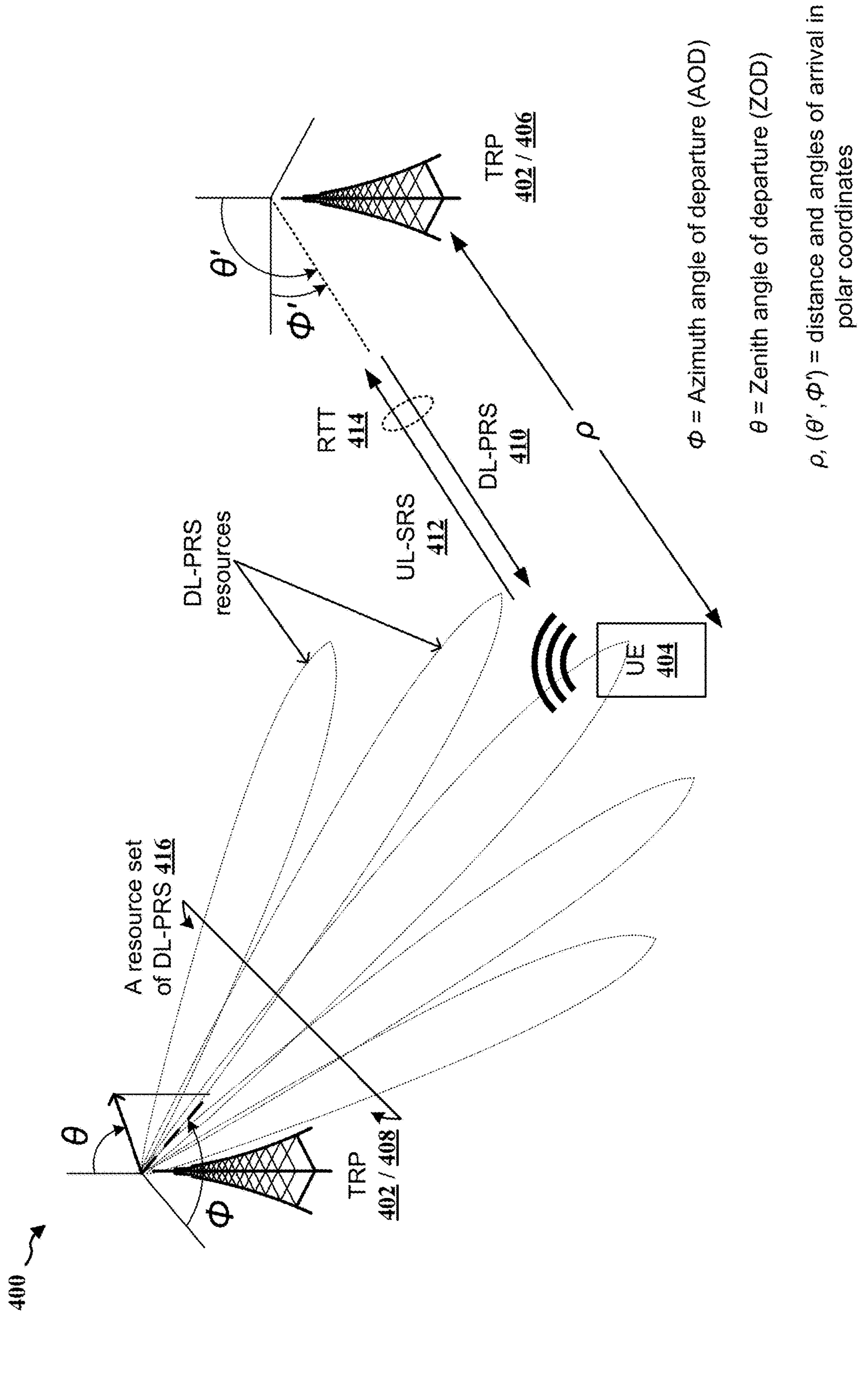
FIG. 4 is a diagram illustrating an example of a UE positioning based on reference signal measurements in accordance with various aspects of the present disclosure.

FIG. 4 is a diagram 400 illustrating an example of a UE positioning based on reference signal measurements in accordance with various aspects of the present disclosure. In one example, a location of UE 404 may be estimated based on multi-cell round trip time (multi-RTT) measurements, where multiple TRPs 402 may perform round trip time (RTT) measurements for signals transmitted to and received from the UE 404 to determine the approximate distance of UE 404 with respect to each of the multiple TRPs 402. Similarly, the UE 404 may perform RTT measurements for signals transmitted to and received from the TRPs 402 to determine the approximate distance of each TRP with respect to the UE 404. Then, based at least in part on the approximate distances of UE 404 with respect to the multiple TRPs 402, a location management function (LMF) that is associated with the TRPs 402 and/or the UE 404 may estimate the position of UE 404. For example, a TRP 406 may transmit at least one downlink positioning reference signal (DL-PRS) 410 to the UE 404, and may receive at least one uplink sounding reference signal (UL-SRS) 412 transmitted from the UE 404. Based at least in part on measuring an RTT 414 between the DL-PRS 410 transmitted and the UL-SRS 412 received, a serving base station associated with the TRP 406 or an LMF associated with the TRP 406 may identify the position of UE 404 (e.g., distance) with respect to the TRP 406. Similarly, the UE 404 may transmit UL-SRS 412 to the TRP 406, and may receive DL-PRS 410 transmitted from the TRP 406. Based at least in part on measuring the RTT 414 between the UL-SRS 412 transmitted and the DL-PRS 410 received, the UE 404 or an LMF associated with the UE 404 may identify the position of TRP 406 with respect to the UE 404. The multi-RTT measurement mechanism may be initiated by the LMF that is associated with the TRP 406/408 and/or the UE 404. A TRP may configure UL-SRS resources to a UE via radio resource control (RRC) signaling. In some examples, the UE and the TRP may report the multi-RTT measurements to the LMF, and the LMF may estimate the position of the UE based on the reported multi-RTT measurements.

In other examples, a position of a UE may be estimated based on multiple antenna beam measurements, where a downlink angle of departure (DL-AoD) and/or uplink angle of arrival (UL-AoA) of transmissions between a UE and one or more TRPs may be used to estimate the position of the UE and/or the distance of the UE with respect to each TRP. For example, referring back to FIG. 6, with regard to the DL-AoD, the UE 404 may perform reference signal received power (RSRP) measurements for a set of DL-PRS 416 transmitted from multiple transmitting beams (e.g., DL-PRS beams) of a TRP 408, and the UE 404 may provide the DL-PRS beam measurements to a serving base station (or to the LMF associated with the base station). Based on the DL-PRS beam measurements, the serving TRP or the LMF may derive the azimuth angle (e.g., Φ) of departure and the zenith angle (e.g., θ) of departure for DL-PRS beams of the TRP 408. Then, the serving TRP or the LMF may estimate the position of UE 404 with respect to the TRP 408 based on the azimuth angle of departure and the zenith angle of departure of the DL-PRS beams. Similarly, for the UL-AoA, a position of a UE may be estimated based on UL-SRS beam measurements measured at different TRPs, such as at the TRPs 402. Based on the UL-SRS beam measurements, a serving base station or an LMF associated with the serving base station may derive the azimuth angle of arrival and the zenith angle of arrival for UL-SRS beams from the UE, and the serving base station or the LMF may estimate the position of the UE and/or the UE distance with respect to each of the TRPs based on the azimuth angle of arrival and the zenith angle of arrival of the UL-SRS beams.

Figure 5B:
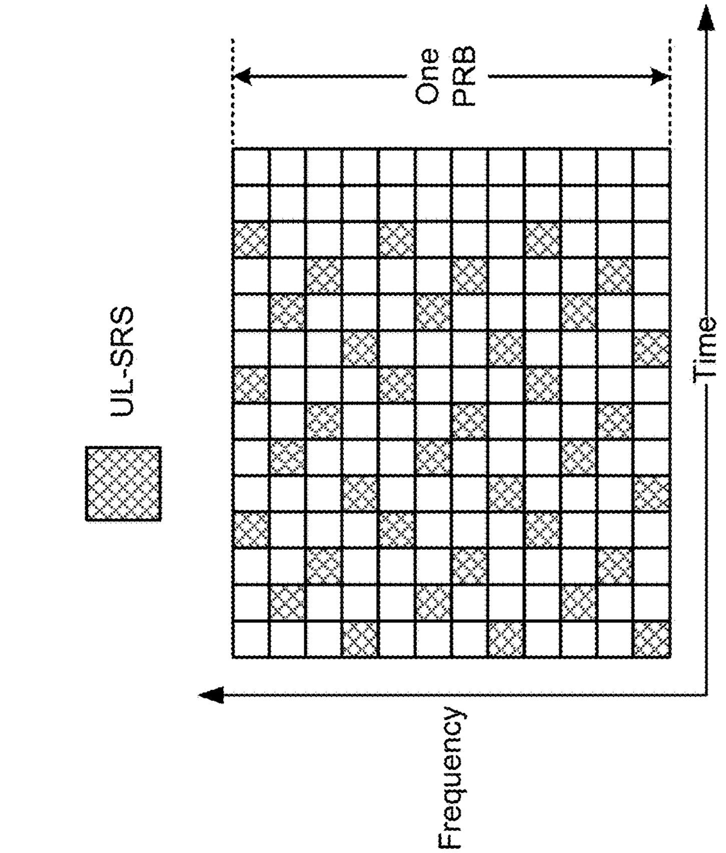
FIG. 5B is a diagram illustrating an example of uplink-sounding reference signal (UL-SRS) transmitted from a UE in accordance with various aspects of the present disclosure.
Figure 5A:
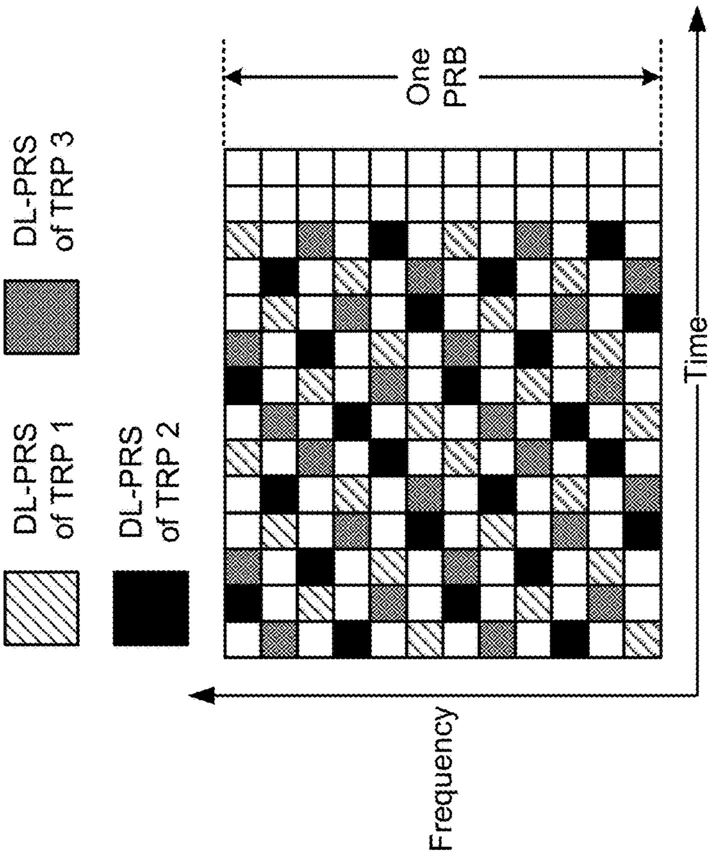
FIG. 5A is a diagram illustrating an example of downlink-positioning reference signal (DL-PRS) transmitted from multiple transmission-reception points (TRPs) in accordance with various aspects of the present disclosure.

FIG. 5A is a diagram 500A illustrating an example of DL-PRS transmitted from multiple TRPs in accordance with various aspects of the present disclosure. In one example, a serving base station may configure DL-PRS to be transmitted from one or more TRPs within a slot or across multiple slots. If the DL-PRS is configured to be transmitted within a slot, the serving base station may configure the starting resource element in time and frequency from each of the one or more TRPs. If the DL-PRS is configured to be transmitted across multiple slots, the serving base station may configure gaps between DL-PRS slots, periodicity of the DL-PRS, and/or density of the DL-PRS within a period. The serving base station may also configure the DL-PRS to start at any physical resource block (PRB) in the system bandwidth. In one example, the system bandwidth may range from 24 to 276 PRBs in steps of 4 PRBs (e.g., 24, 28, 32, 36, etc.). The serving base station may transmit the DL-PRS in PRS beams, where a PRS beam may be referred to as a "PRS resource" and a full set of PRS beams transmitted from a TRP on a same frequency may be referred to as a "PRS resource set" or a "resource set of PRS," such as described in connection with FIG. 4. As shown by FIG. 5A, the DL-PRS transmitted from different TRPs and/or from different PRS beams may be multiplexed across symbols or slots.

In some examples, each symbol of the DL-PRS may be configured with a comb-structure in frequency, where the DL-PRS from a TRP of a base station may occupy every $N^{th}$ subcarrier. The comb value N may be configured to be 2, 4, 6, or 12. The length of the PRS within one slot may be a multiple of N symbols and the position of the first symbol within a slot may be flexible as long as the slot consists of at least N PRS symbols. The diagram 500A shows an example of a comb-6 DL-PRS configuration, where the pattern for the DL-PRS from different TRPs may be repeated after six (6) symbols.

FIG. 5B is a diagram 500B illustrating an example of UL-SRS transmitted from a UE in accordance with various aspects of the present disclosure. In one example, the UL-SRS from a UE may be configured with a comb-4 pattern, where the pattern for UL-SRS may be repeated after four (4) symbols. Similarly, the UL-SRS may be configured in an SRS resource of an SRS resource set, where each SRS resource may correspond to an SRS beam, and the SRS resource sets may correspond to a collection of SRS resources (e.g., beams) configured for a TRP. In some examples, the SRS resources may span 1, 2, 4, 8, or 12 consecutive OFDM symbols. In other examples, the comb size for the UL-SRS may be configured to be 2, 4, or 8.

Figure 6:
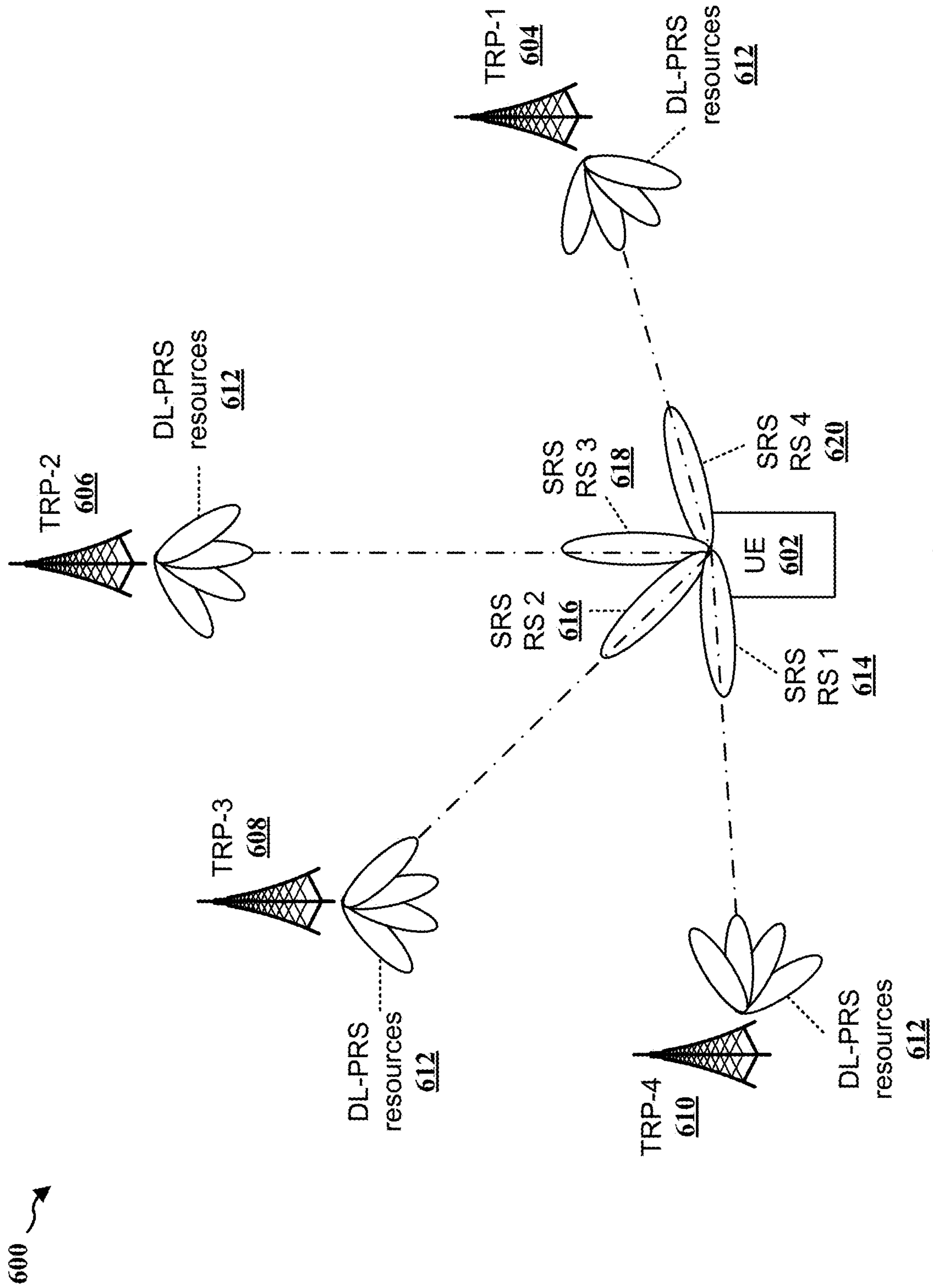
FIG. 6 is a diagram illustrating an example of estimating a position of a UE based on multi-round trip time (RTT) measurements from multiple TRPs in accordance with various aspects of the present disclosure.

FIG. 6 is a diagram 600 illustrating an example of estimating a position of a UE based on multi-RTT measurements from multiple TRPs in accordance with various aspects of the present disclosure. A UE 602 may be configured by a serving base station to decode DL-PRS resources 612 that correspond to and are transmitted from a first TRP 604 (TRP-1), a second TRP 606 (TRP-2), a third TRP 608 (TRP-3), and a fourth TRP 610 (TRP-4). The UE 602 may also be configured to transmit UL-SRSs on a set of UL-SRS resources, which may include a first SRS resource 614, a second SRS resource 616, a third SRS resource 618, and a fourth SRS resource 620, such that the serving cell(s), e.g., the first TRP 604, the second TRP 606, the third TRP 608, and the fourth TRP 610, and as well as other neighbor cell(s), may be able to measure the set of the UL-SRS resources transmitted from the UE 602. For multi-RTT measurements based on DL-PRS and UL-SRS, as there may be an association between a measurement of a UE for the DL-PRS and a measurement of a TRP for the UL-SRS, the smaller the gap is between the DL-PRS measurement of the UE and the UL-SRS transmission of the UE, the better the accuracy may be for estimating the position of the UE and/or the distance of the UE with respect to each TRP.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

In addition to network-based UE positioning technologies, a wireless device (e.g., a base station, a UE, etc.) may also be configured to include radar capabilities, which may be referred to as "radio frequency (RF) sensing" and/or "cellular-based RF sensing." For example, a wireless device may transmit radar reference signals (RRSs) and measure the RRSs reflected from one or more objects. Based at least in part on the measurement, the wireless device may determine or estimate a distance between the wireless device and the one or more objects based. In another example, a first wireless device may also receive RRSs transmitted from one or more wireless devices, where the first wireless device may determine or estimate a distance between the first wireless device and one or more wireless devices based at least in part on the received RRS. As such, in some examples, RF sensing techniques may be used for UE positioning and/or for assisting UE positioning. For purposes of the present disclosure, a device that is capable of performing RF sensing (e.g., transmitting and/or receiving RRS for detecting an object) may be referred to as an "RF sensing node." For example, an RF sensing node may be a UE, a base station, a TRP, a device capable of transmitting RRS, and/or a device configured to perform radar functions, etc.

Figure 7:
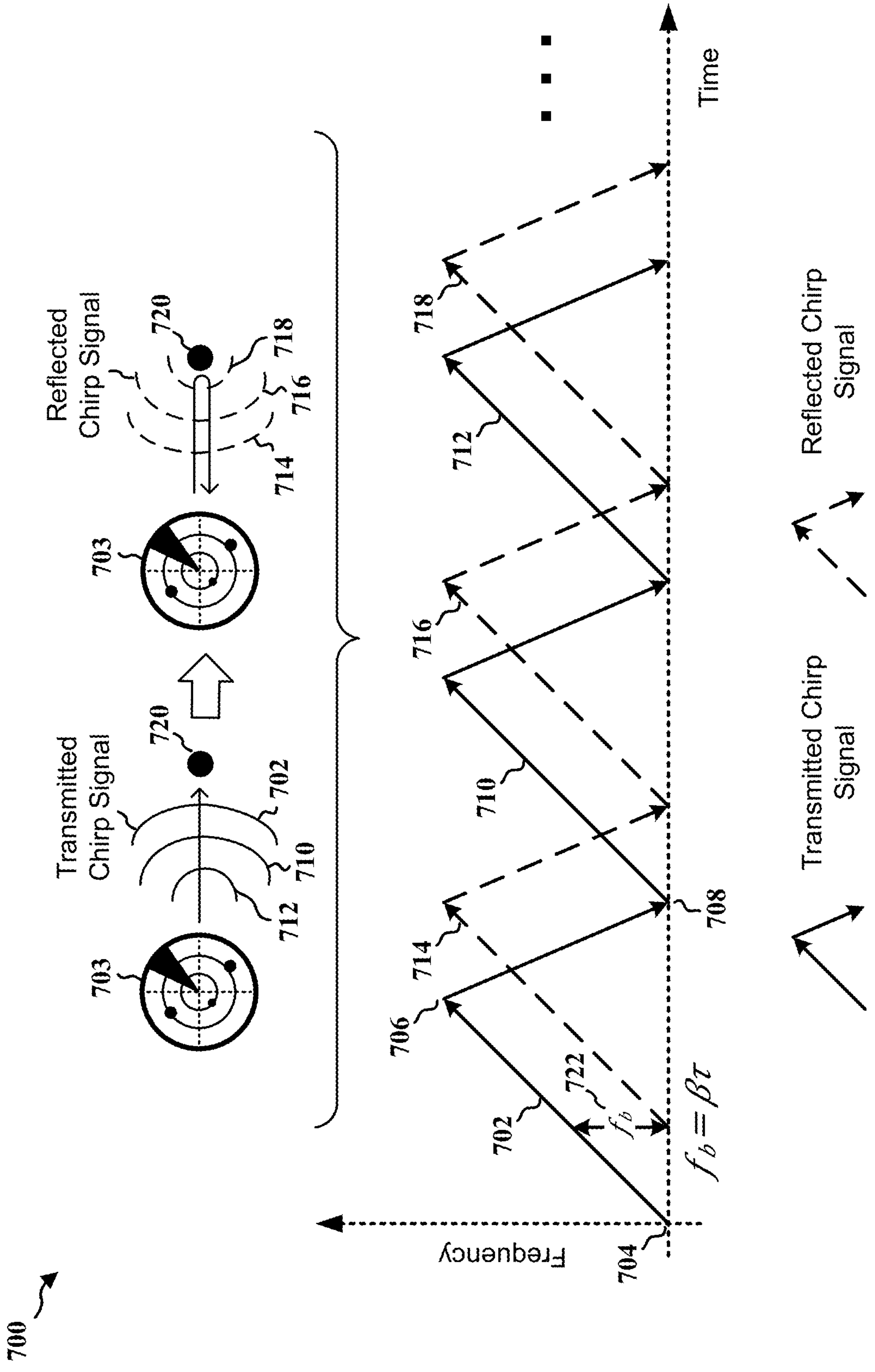
FIG. 7 is a diagram illustrating an example of radar signals (e.g., radar reference signals (RRSs)) generated from a wireless device in accordance with various aspects of the present disclosure.

FIG. 7 is a diagram 700 illustrating an example radar signal (e.g., RRS) generated from an RF sensing node in accordance with various aspects of the present disclosure.

An RF sensing node 703 may detect an object 720 (e.g., the location, the distance, and/or the speed of the object 720 with respect to the RF sensing node 703) by transmitting RRS towards the object 720 and receiving the RRS reflected (e.g., bounce off) from the object 720. In some examples, the object 720 may be a radar receiver or have a capability to receive and process RRS. In one example, the RRS may be a chirp signal that includes a frequency that varies linearly (e.g., has a frequency sweeping) over a fixed period of time (e.g., over a sweep time) by a modulating signal. For example, as shown by the diagram 700, a transmitted chirp signal 702 may have a starting frequency at 704 of a sinusoid. Then, the frequency may gradually (e.g., linearly) increase on the sinusoid until it reaches an ending (or highest) frequency at 706 of the sinusoid, and then the frequency of the signal may return to the starting frequency as shown at 708 and another chirp signal 710 may be transmitted in the same way. In other words, each chirp signal may include an increase in frequency (e.g., linearly) and a drop in frequency or vice versa (e.g., including a decrease in frequency and then an increase in frequency), such that the RF sensing node 703 may transmit chirp signals sweeping in frequency. In some examples, such chirp signal may also be referred to as a frequency modulated continuous wave (FMCW).

After a chirp signal (e.g., chirp signal 702, 710, 712, etc.) is transmitted by the RF sensing node 703, the transmitted chirp signal may reach the object 720 and reflect back to the RF sensing node 703, such as shown by the reflected chirp signals 714, 716, and 718, which may correspond to the transmitted chirp signals 702, 710, and 712, respectively. As there may be a distance between the RF sensing node 703 and the object 720 and/or it may take time for a transmitted chirp signal to reach the object 720 and reflect back to the RF sensing node 703, a delay may exist between a transmitted chirp signal and its corresponding reflected chirp signal. As the delay may be proportional to a range between the RF sensing node 703 and the object 720 (e.g., the further the target, the larger the delay and vice versa), the RF sensing node 703 may be able to measure or estimate a distance between the RF sensing node 703 and the object 720 based on the delay.

In some examples, the RF sensing node 703 may also measure a difference in frequency between the transmitted chirp signal and the reflected chirp signal, which may also be proportional to the distance between the RF sensing node 703 and the object 720. In other words, as the frequency difference between the reflected chirp signal and the transmitted chirp signal increases with the delay, and the delay is linearly proportional to the range, the distance of the object 720 from the RF sensing node 703 may also be determined based on the difference in frequency. Thus, the reflected chirp signal from the object 720 may be mixed with the transmitted chirp signal and down-converted to produce a beat signal ($f_b$) which may be linearly proportional to the range after demodulation. For example, the RF sensing node 703 may determine a beat signal 722 by mixing the transmitted chirp signal 702 and its corresponding reflected chirp signal 714. While examples in the diagram illustrate using an FMCW waveform for the RRS, other types of radar waveforms may also be used by the RF sensing node 703 for the RRS.

Due to an increased amount of bandwidth (BW) being allocated for cellular communications systems (e.g., 5G and beyond) and an increased amount of applications (e.g., use cases) being introduced with cellular communications systems, joint communication and RF sensing may become an important feature for cellular systems. For example, a wireless device (e.g., a base station, a UE, an RF sensing node, etc.) may be configured to transmit communication signals (e.g., PDSCH, PUSCH, etc.) with radar signals (e.g., RRS) together or simultaneously. In addition, OFDM waveform (or its variants) may likely be considered as the waveform for joint communication/RF sensing as the OFDM waveform may enable in-band multiplexing with other cellular reference signals and physical channels. As such, the radar signals may be multiplexed with communication signals based on OFDM waveform. For purposes of the present disclosure, a wireless device that performs an RF sensing based on OFDM waveform(s) or transmits RRS based on OFDM waveform(s) may be referred to as an "OFDM radar."

For some RF sensing designs, the waveform configuration and/or the resource allocation may be based on upper bound(s) of a performance metric, such as based on the maximum range for an RF signal to be transmitted by an RF sensing node, or the range/Doppler resolution to be provided by the RF sensing node, etc. In some scenarios, such RF sensing design approach may not be flexible enough to be adaptive to a dynamic environment, such as when the RF sensing is to be deployed at a wide outdoor area. For example, as many objects (e.g., animals, transportations, humans) may be moving at an outdoor area, an RF sensing design that is based on the upper bound(s) of a performance metric may not be able to provide accurate object detections sometimes as the RF sensing design may not have taken the moving objects into consideration.

Aspects presented herein may improve the performance and the accuracy for RF sensing. Aspects presented may enable RF sensing to be adaptive to the environment to improve the sensing, performance, and/or the spectrum efficiency of cellular systems and the power efficiency of RF sensing nodes (e.g., base station and/or UE). For example, in one aspect of the present disclosure, if a network is able to determine the direction of a target, the network may guide an RF sensing node (or a radar transmission (Tx)) to beamform toward the target to enhance the Signal-to-noise ratio (SNR). In another example, if a network is able to determine that there is no small object to be sensed, the network may reduce the Tx power and/or the waveform repetitions of an RF sensing node to achieve power saving. In some examples, one or more features (e.g., parameters to be reported to a network to enable adaptive RF sensing) may be extracted/derived based on non-RF method(s), such as via a camera, an ultra-sound sensor, a light detection and ranging (lidar) sensor, and/or a barometric sensor, etc. The non-RF based feature extraction/derivation may be implemented on an RF sensing node based on a real-time setting. Also, the non-RF based feature extraction/derivation may have less interference issue(s) compared with RF based feature extraction/derivation.

Figure 8:
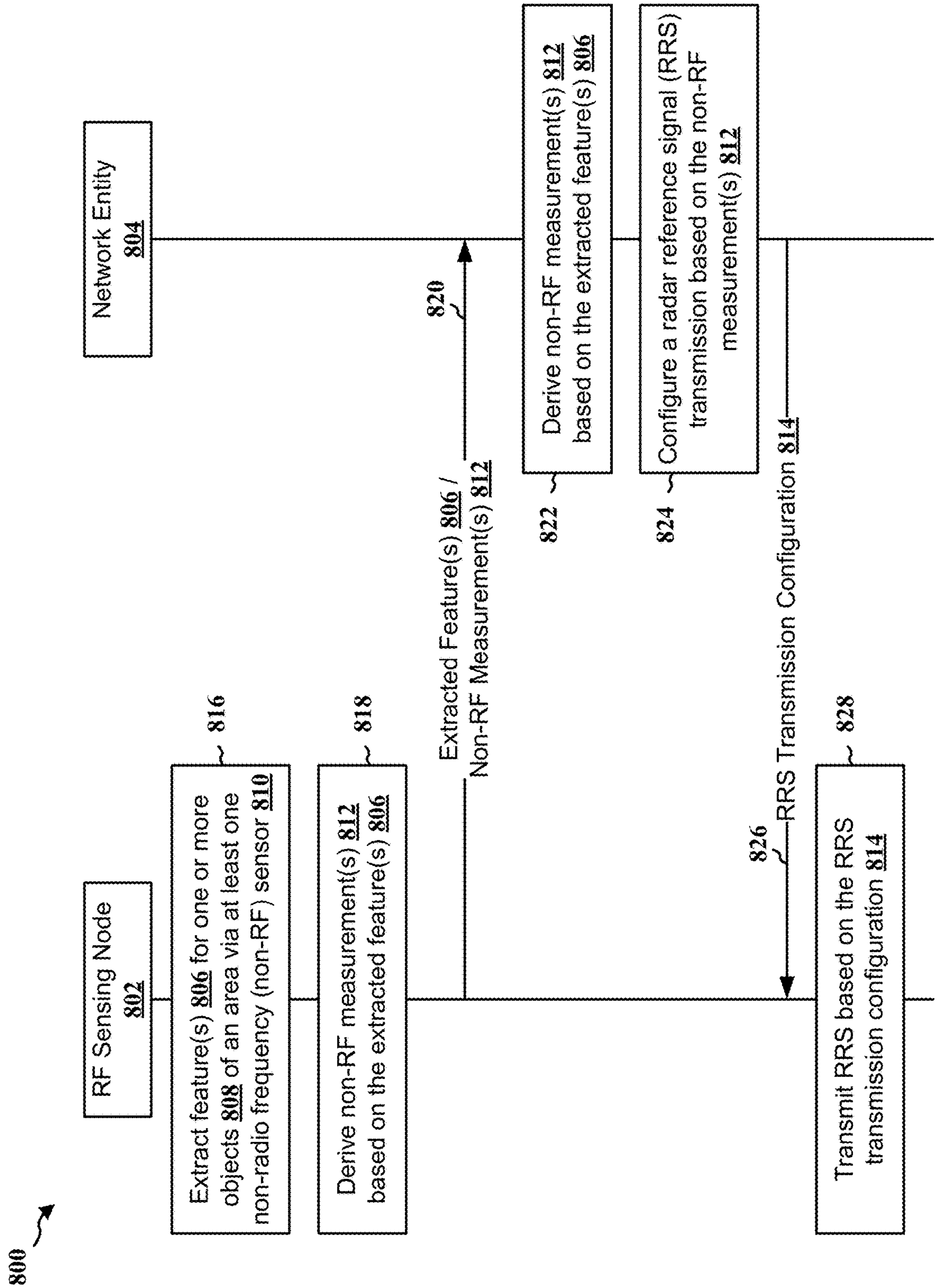
FIG. 8 is a communication flow illustrating an example of radio frequency (RF) sensing based on non-RF measurement in accordance with various aspects of the present disclosure.

FIG. 8 is a communication flow 800 illustrating an example of RF sensing based on non-RF measurement in accordance with various aspects of the present disclosure. The numberings associated with the communication flow 800 do not specify a particular temporal order and are merely used as references for the communication flow 800. An RF sensing node 802 (e.g., a UE, a base station, a device capable of RF sensing, etc.) may be configured by a network entity (e.g., a server for sensing, which may include or may be a location server and/or an LMF, etc.) to perform RF sensing for an area. The RF sensing node 802 may include at least one non-RF sensor 810. For purposes of the present disclosure, a non-RF sensor may refer to a sensor that does not transmit RF signals. For example, a non-RF sensor may be a camera, an ultra-sound sensor, a light detection and ranging (lidar) sensor, and/or a barometric sensor, etc. In addition, a "server for sensing" or a "sensing server" may refer to an entity that is at least partially responsible for managing or controlling the RF sensing performed by an RF sensing node. Thus, the server for sensing or the sensing server may be a location server/LMF or be part of a location server/LMF depending on the network implementation.

As shown at 816, during an RF sensing session, the RF sensing node 802 may use the at least one non-RF sensor 810 to extract one or more features 806 for one or more objects 808 of the area. In one example, the one or more features 806 may include the RCS, the size, the shape, the classification, the material, the orientation, the location, and/or the speed of the one or more objects 808.

Figure 9:
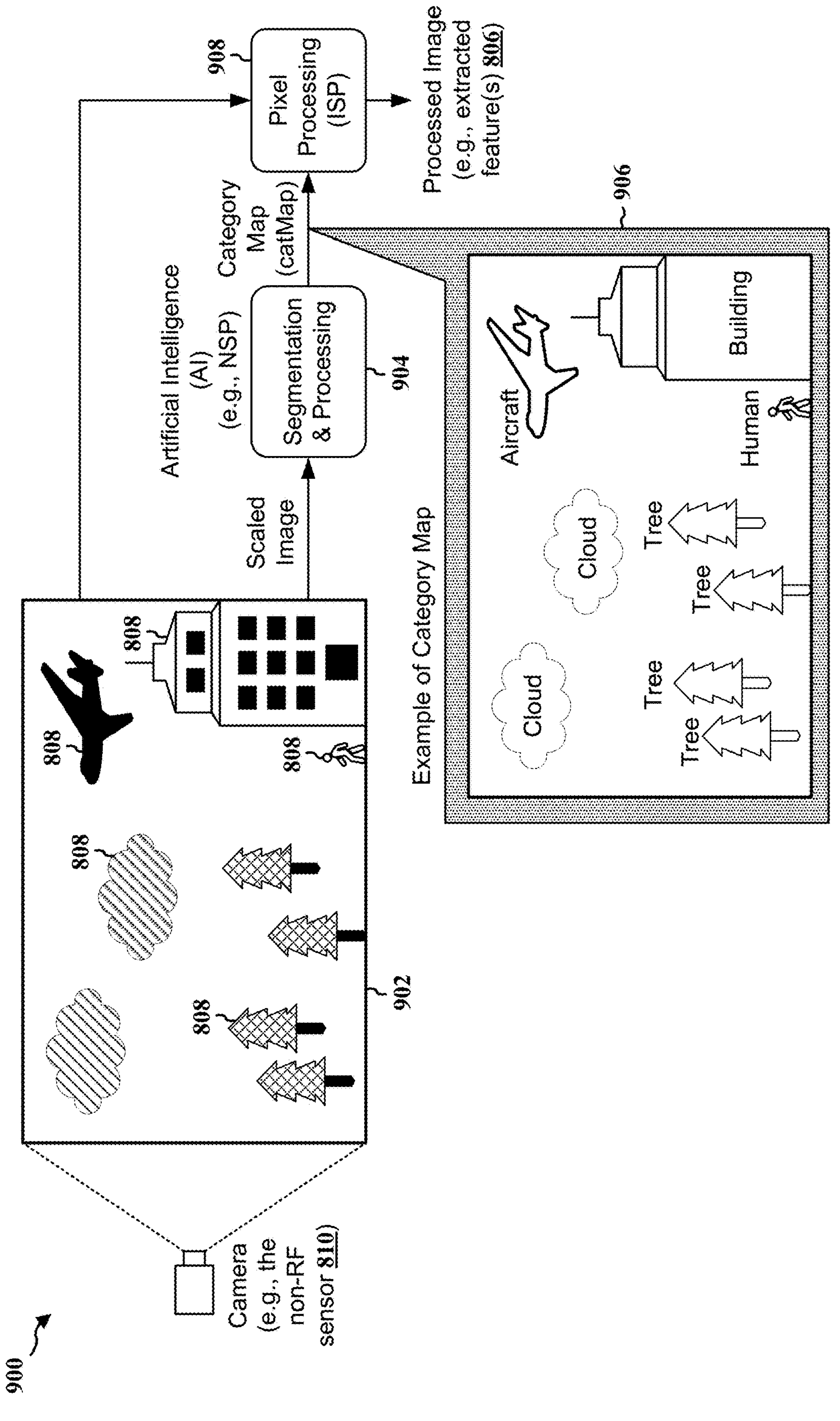
FIG. 9 is a diagram illustrating an example of extracting features for one or more objects based on a non-RF sensor in accordance with various aspects of the present disclosure.

FIG. 9 is a diagram 900 illustrating an example of extracting features for one or more objects based on a non-RF sensor in accordance with various aspects of the present disclosure. An RF sensing node (e.g., the RF sensing node 802) with a camera (e.g., the non-RF sensor 810) may be used to capture images of an area that is to be sensed by the RF sensing node, such as shown at 902. Then, as shown at 904, the captured images may be processed by an artificial intelligence (AI) processing unit associated with the camera, such as by a neural signal processor (NSP), to generate a category map (which may be based on a segmentation process) that identifies objects in the captured images, such as shown at 906. For example, the category map may show that the captured images include multiple objects (e.g., the one or more objects 808 in FIG. 8), such as clouds, trees, a human, an aircraft, and a building, etc. Then, as shown at 908, the category map may further be processed by an image signal processor (ISP) unit/hardware associated with the camera, where the ISP unit/hardware may adjust the color of different segments of the captured images based on the category map and offline tuning data to produce a processed image (e.g., an image with extracted features). As such, the RF sensing node may extract one or more features of an area to be sensed using a non-RF sensor.

Referring back to FIG. 8, at 818, after the RF sensing node 802 extracts the one or more features 806 for the one or more objects 808 of the area, the RF sensing node 802 may derive or compute one or more non-RF measurements 812 for the one or more objects 808 based on the one or more features 806 extracted. For example, in one aspect of the present disclosure, the RF sensing node 802 may derive a radar cross-section (RCS) for the one or more objects 808 based on the classification, size, shape, material, and/or orientation of the one or more objects 808. The RCS may refer to a measurement indicating how detectable an object may be by a radar device, which may also be referred to as an electromagnetic signature of the object in some examples. For example, a larger RCS may indicate that an object may be more easily detected by a radar compared to a lower RCS. As such, RCS of an object (o) may depend on the object's shape and material, and also on the wavelength and/or incident angle of the electromagnetic wave.

Figure 10:
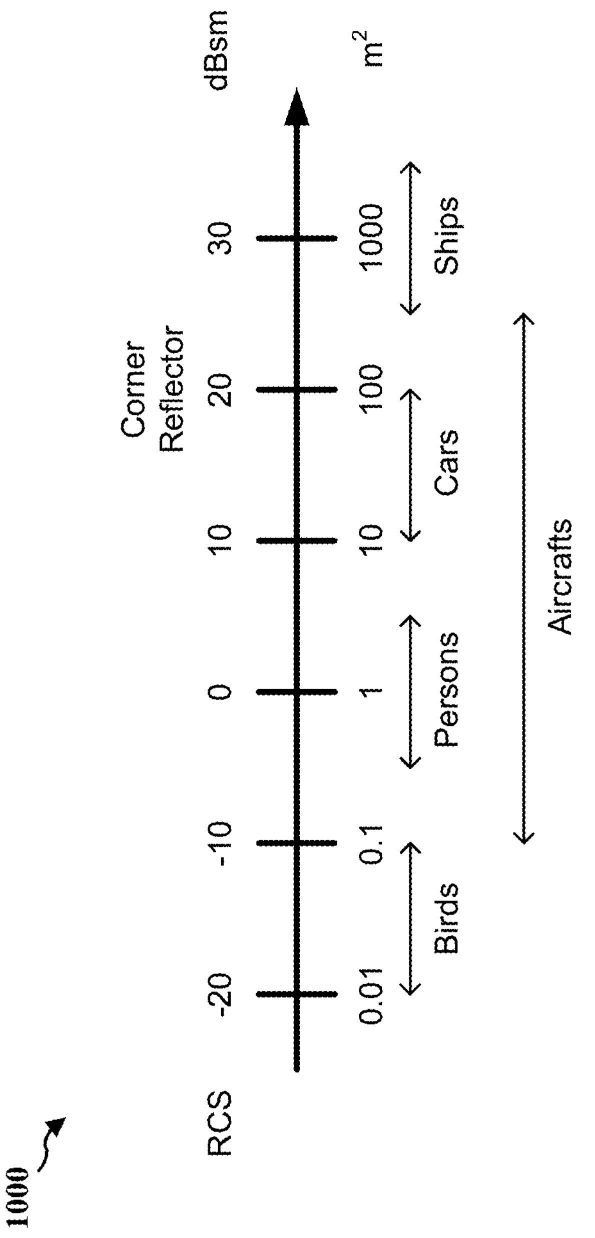
FIG. 10 is a diagram illustrating example radar cross section (RCS) values for different objects in accordance with various aspects of the present disclosure.

FIG. 10 is a diagram 1000 illustrating example RCS values for different objects in accordance with various aspects of the present disclosure. Different types of objects may have different ranges of RCS. For example, a typical RCS for cars may be approximately 10-20 decibels per square meter (dBsm), and a typical RCS for ships may be approximately 25-35 dBsm, etc. As an object may reflect a limited amount of radar energy (e.g., the RRS) back to the source, factors that may influence the amount of energy reflected from the object may include: the material for which the object is made; the size of the object relative to the wavelength of the illuminating radar signal; the absolute size of the object; the incident angle (angle at which the radar beam hits a particular portion of the object, which may depend upon the shape of the object and its orientation to the radar source; the reflected angle (angle at which the reflected beam leaves the part of the object hit; it depends upon incident angle); and/or the polarization of the transmitted and the received radiation with respect to the orientation of the object, etc. In some examples, the one or more features 806 (e.g., the size, shape, material, and/or orientation of the one or more objects 808) may be derived by other sensors (or fused with other sensor(s), in addition to camera). For example, the material of an object may be sensed by an ultra-sound sensor, and the speed and orientation of an object may be sensed by a lidar, etc.

Referring back to FIG. 8, at 820, after the RF sensing node 802 derives the one or more non-RF measurements 812, the RF sensing node 802 may transmit the one or more non-RF measurements 812 to the network entity 804.

In one example, as an alternative, the RF sensing node 802 may skip deriving the non-RF measurements 812 based on the one or more features 806, and the RF sensing node 802 may transmit the one or more features 806 to the network entity 804 at 820. Then, as shown at 822, the network entity 804 may derive or compute the one or more non-RF measurements 812 for the one or more objects 808 based on the one or more features 806 received. In other words, the non-RF measurements derivation may be performed by the network entity 804 instead of the RF sensing node 802.

At 824, after either receiving the non-RF measurements 812 from the RF sensing node 802 or deriving the one or more non-RF measurements 812 based on the one or more features 806, the network entity may configure an RRS transmission configuration 814 based at least in part on the non-RF measurements 812. For example, after the RF sensing node 802 derive RCS values for the one or more objects 808 and report the RCS values to the network entity 804, the network entity 804 may configure (or reconfigure) an RRS transmission for the RF sensing node 802 based on the non-RF measurements 812 to optimize the RF sensing. For example, if the RCS value for an object to be detected is below a threshold (e.g., is small or hard to detect), the network entity 804 may increase the Tx power for one or more antennas, the number of Tx antennas for the RRS transmission, the periodicity for transmitting the RRS, and/or the RRS repetition factor, etc., of the RF sensing node 802; whereas if the RCS value for an object to be detected is above a threshold (e.g., is large or easy to detect), the network entity 804 may decrease the Tx power for one or more antennas, the number of Tx antennas for the RRS transmission, and/or the RRS repetition factor, etc., of the RF sensing node 802. In another example, if the non-RF measurements 812 or the extracted features 806 indicate that a target object is static, the network entity 804 may increase the RRS periodicity to save power. For example, the non-RF sensor 810 (e.g., such as a camera) may be used for detecting the mobility of the target. As such, in one aspect of the present disclosure, the RRS transmission configuration may include a transmission power for one or more antennas of the RF sensing node for transmitting an RRS, a number of transmission antennas for transmitting the RRS, a periodicity for transmitting the RRS, an RRS repetition factor associated with transmitting the RRS, or a combination thereof, etc.

In some scenarios, the non-RF sensor 810 (e.g., a camera capturing image) may consume more power than an RF sensor (e.g., for performing RF measurement). Thus, in another aspect of the present disclosure, the non-RF sensor 810 or the RF sensing node 802 itself may be configured to operate based on on-demand request or trigger RF based sensing/measurement. For example, the non-RF sensor 810 or the RF sensing node 802 may be triggered to perform the feature extraction and/or the non-RF measurement based on a request from the network entity 804, and/or based on there being an RF measurement specified. In another example, for a trigger RF based sensing, the non-RF measurement module or the sensing node itself may on-demand request or trigger RF based measurement, such as by reporting its power consumption status explicitly or implicitly. In some examples, the reporting may or may not related to an object to be detected. For example, if the non-RF measurement module knows an object is static, it may on-demand request the RF measurement module and shut-down the non-RF measurement module. In other words, the RF sensing may be triggered by the non-RF sensing component in the RF sensing node (e.g., gNB or UE), where the condition for the trigger may be based on power consumption, memory cost, and/or feature(s) associated with the object(s) to be detected or measured.

In some examples, at 820, the RF sensing node 802 may also report its power consumption status, either explicitly or implicitly, to the network entity 804, such that the network entity 804 may also configure the RRS transmission based at least in part on the power consumption status of the RF sensing node 802. For example, if the RF sensing node 802 reports that the power consumption is high or above a power threshold, the network entity 804 may decrease the Tx power for one or more antennas, the number of Tx antennas for the RRS transmission, and/or the RRS repetition factor, etc., of the RF sensing node 802; whereas if the RF sensing node 802 reports that the power consumption is low, moderate, or above a power threshold, the network entity 804 may increase the Tx power for one or more antennas, the number of Tx antennas for the RRS transmission, the periodicity for transmitting the RRS, and/or the RRS repetition factor, etc., of the RF sensing node 802.

As such, in some examples, the reporting at 810 may or may not related to the one or more objects 808. For example, if the non-RF sensor 810 detects that an object is static, the non-RF sensor 810 may on-demand request the RF based measurement to be triggered (e.g., by an RF sensor) and shut-down the non-RF sensor based measurement. This may also be an example of trigger RF based sensing.

At 826, the network entity 804 may transmit the RRS transmission configuration 814 to the RF sensing node 802 to configure or modify the RRS transmission of the RF sensing node 802.

At 828, after receiving the RRS transmission configuration 814, the RF sensing node 802 may configure/reconfigure its RRS transmission, and the RF sensing node 802 may transmit its RRS based on the new configuration.

As illustrated by the communication flow 800, aspects presented herein may enable a network entity to adjust RF sensing parameters of an RF sensing node dynamically based on one or more features or non-RF measurements extracted or derived from one or more objects of an area to be sensed, thereby improving the accuracy and performance of the RF sensing.

In another aspect of the present disclosure, a network entity may configure waveform and resource of RRS for an RF sensing node based on non-RF sensing and non-RF measurement (e.g., based on using at least one non-RF sensor, such as the non-RF sensor 810). For example, a network entity may configure a cyclic prefix (CP) duration of a transmission based on the size of one or more objects to be detected if the RRS transmitted from an RF sensing node is based on an OFDM waveform, which may also be referred to a CP-OFDM waveform (e.g., an OFDM waveform with CP). For purposes of the present disclosure, an RF sensing node that transmits RRS based on OFDM waveform may be referred to as an “OFDM radar.” An OFDM radar may be a UE, a base station, or a device capable of transmitting OFDM signals.

An OFDM radar may provide a large degree of flexibility in waveform choices, which may enable communication and radar capabilities to be combined by embedding communication information into the radar waveform. In some examples, OFDM waveforms may be used for digital or software-defined radar that may be independent of the communication aspect. In addition, for many OFDM radar applications, unlike the OFDM waveforms used by a UE or a base station for communications, the OFDM waveforms used by OFDM radar applications may not include a cyclic prefix (CP) or a sufficiently long CP. Thus, these OFDM radar waveforms may sometimes be treated as different kinds of radar waveforms by a receiver, and the receiver may receive or monitor these OFDM radar waveforms based on matched filtering. Matched filtering may refer to a process for detecting a known piece of signal or wavelet that is embedded in noise. As such, an OFDM waveform may be a natural waveform utilized for joint communication and RF sensing for future wireless communications, as it may enable in-band multiplexing with other cellular reference signals and physical (PHY) channels.

A CP may refer to a set of samples that are duplicated (e.g., copied and pasted) from the end of each transmitted symbol to its beginning. In addition, the CP may function as a guard interval that may be used for eliminating intersymbol interference (ISI) (e.g., interference between transmitting data via multiple symbols), such as without using additional hardware. Thus, when there is sufficient CP insertion (or CP duration) in an OFDM waveform, an ISI channel may be converted into multiple ISI-free subchannels in a wireless communications system. Similarly, or analogously, a sufficient CP insertion may also enable an inter-range-cell interference (IRCI)-free (high range resolution) RF sensing for radar systems. For example, by using a sufficient CP, the IRCI-free and ideally zero range sidelobes for range reconstruction may be obtained, which may provide an opportunity for high range resolution synthetic aperture radar (SAR) imaging. In other words, OFDM signals with a sufficient CP may be used for solving IRCI-related problems. For purposes of the present disclosure, a range resolution may refer to the capability of a radar system to distinguish or resolve nearby adjacent target(s) or different parts of one target in the range. The degree of range resolution may depend on the width of the transmitted pulse, the types and sizes of targets, and the efficiency of the receiver and indicator, etc.

To achieve IRCI-free RF sensing for an OFMD waveform, the CP length $T_{cp}$ for the OFDM waveform may be specified to be greater than or equal to the time delay difference ($T_o$) from a first range cell of a tracking zone to a last range cell of the tracking zone (e.g., satisfy $T_{cp} \geq T_o$). A range cell may refer to the smallest range increment a radar is capable of detecting, and a range (for a radar) may refer to the length of a straight line between the radar and a target. For example, if a radar has a range resolution of 1 yard and a total range of 100 yards, then there may be 100 range cells (e.g., 100/1=100).

Figure 11:
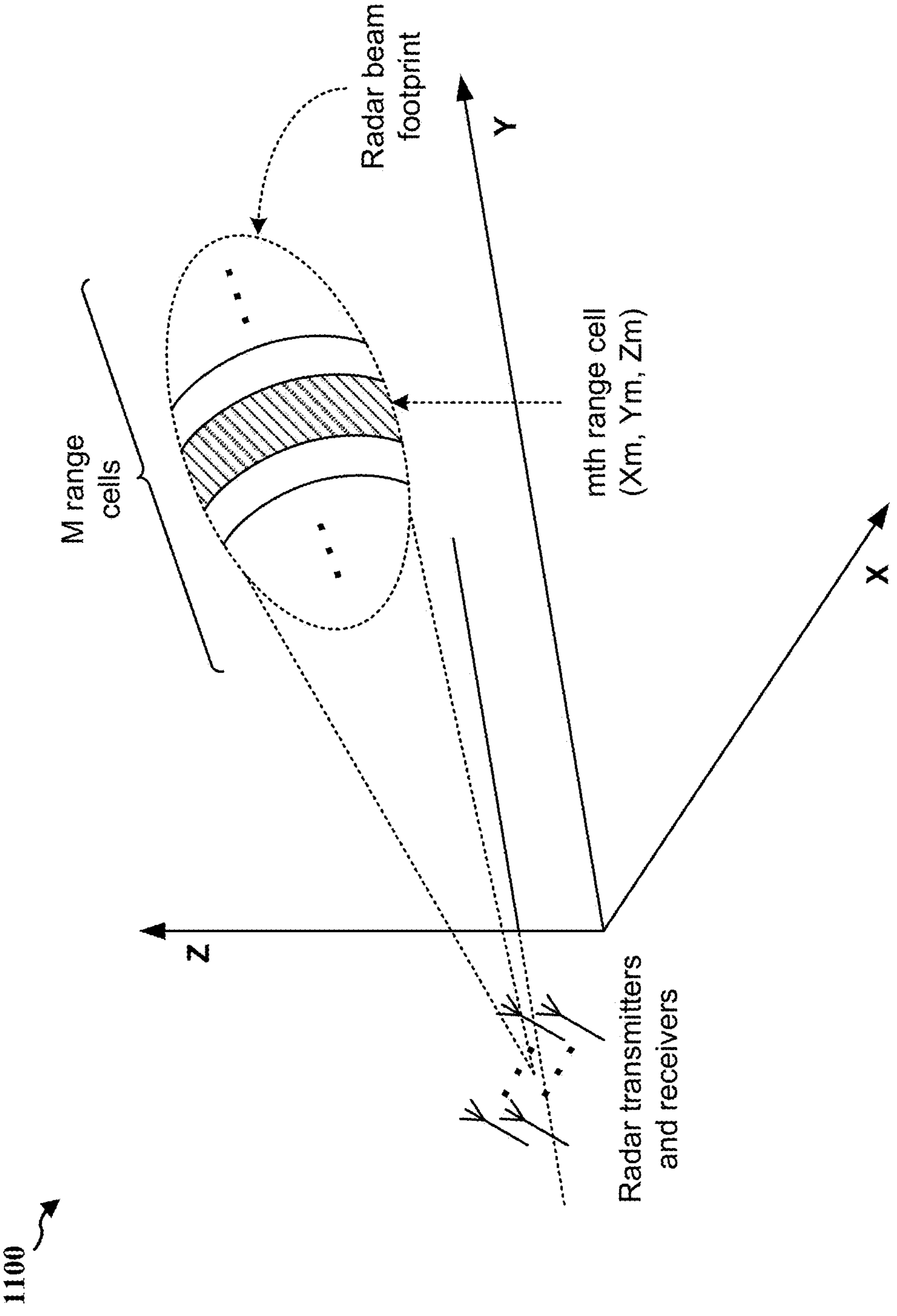
FIG. 11 is a diagram illustrating an example of range cells in accordance with various aspects of the present disclosure.

FIG. 11 is a diagram 1100 illustrating an example of range cells in accordance with various aspects of the present disclosure. The time delay difference ($T_o$) may be calculated based on:

$$T_o = 2(M-1)R/c = (M-1)/B,$$

where c may be the speed of light, B may be the bandwidth of a radar signal, M may be the number of range cells in the tracking zone, and R may be the range solution that is obtained based on R=c/(2B). In one example, to minimize unnecessary transmission energy, and without loss of generality, the CP length of an OFDM form may be chosen to be equal to the time delay difference (e.g., $T_{cp}=T_o$). As such, when an object to be detected is larger (e.g., has a higher RCS), the network entity may configure a shorter CP for the RRS transmission, whereas when an object to be detected is smaller (e.g., has a lower RCS), the network entity may configure a longer CP for the OFDM waveform. For example, for a wide angle beam-based sensing, the duration of the CP may be configured to cover the delay spread across the sensing area. Thus, if the sensing area is larger, a longer CP may be specified. On the other hand, for a narrow beam based sensing (e.g., based on a narrow beam operation), there may be additional consideration(s) where the duration of the CP may be specified to cover just the size of the target to avoid inter symbol interference. Thus, if the target is smaller, a shorter CP may be specified. In other words, referring back to FIG. 8, the network entity 804 may configure CP duration of a CP-OFDM waveform for the RF sensing node 802 based on the one or more features 806 or the one or more non-RF measurements 812. In one example, to determine the size of an object, the RF sensing node 802 may use a camera to capture the image of an RF sensing area that has the object, and then the AI processor associated with the RF sensing node 802 may estimate the size of the object based on the captured image, such as described in connection with FIG. 9.

In another aspect of the present disclosure, a network entity may use one or more features extracted from one or more objects of an RF sensing area or one or more non-RF measurements derived based on the extracted one or more features to determine and optimize the resource allocation for RRS. For example, the speed of an object may be detected/calculated based on Doppler estimation of the object, and different ranges of the Doppler estimation may specify different time domain allocations for the RRS. For example, if the Doppler estimation of an object is high, it may indicate/infer that the object is moving at a higher speed. Thus, a network entity may configure a shorter RRS transmission periodicity for the RF sensing node, such that two adjacent RRS transmissions may be configured to be closer in the time domain. On the other hand, if the Doppler estimation of an object is low, it may indicate/infer that the object is moving at a lower speed. Thus, a network entity may configure a longer RRS transmission periodicity for the RF sensing node, such that two adjacent RRS transmissions may be configured to be further in the time domain. In another example, the speed of an object may be estimated based on non-RF measurements, such as via images provided by a camera, the echo signal measured from an ultra-sound sensor, and/or measured by a lidar, etc.

In some scenarios, an RF measurement-based beam management may be challenging due to: non-line of sight (NLOS) channel conditions (e.g., there is an obstacle between an RF sensing node and an object to be sensed); the high frequency RF signal may be attenuated by objects, which may impact the beam determination for the RF sensing; the beamforming range and/or the beam resolution may be limited by implementation; or the latency of signaling may impact real-time RF sensing specification.

As such, in another aspect of the present disclosure, a network entity may configure radar transmission (Tx) beam and/or reception beam (Rx) for an RF sensing node based on non-RF sensing and non-RF measurement (e.g., based on using at least one non-RF sensor, such as the non-RF sensor 810). For example, the location of an object, the incident angle of an object (e.g., angle at which the radar beam hits a particular portion of the object), and/or the reflected angle of an (angle at which the reflected beam leaves the part of the object hit) may be used by a network work entity or an RF sensing node to guide the Tx/Rx beamforming for the RF sensing. In other words, an RF sensing node and/or a network entity may use non-RF sensor measurements for detecting a potential target object and/or the location (or the angle) relative to the Tx/Rx beam/direction of the RF sensing node. For example, the RF sensing node may use a camera to capture the image of an RF sensing area, and the AI processor associated with the camera or the RF sensing node may identify the target object, the location of the target object, and/or the relative angle of the target object, etc. In some examples, the RF sensing node may use multiple cameras to more accurately estimate the target object's location and the range information.

After the network entity or the RF sensing node has the relative location or relative angle information of the target object, the network entity or the RF sensing node may configure Tx/Rx beam(s) of the RF sensing node based on the relative location or angle information. For example, the network entity or the RF sensing node may beamform a Tx/Rx beam toward the direction of the target object. In some examples, configuring Tx/Rx beam(s) of an RF sensing node based on non-RF sensing/measurement may be useful for bistatic RF sensing. Bistatic RF sensing may refer to an RF sensing technique where RRS is transmitted and received by different devices. In some examples, a device or system that performs bistatic RF sensing may be referred to as a bistatic radar. In other words, a bistatic radar may be a radar system that includes a transmitter and receiver that are separated by a distance comparable to an expected target distance. When bistatic RF sensing is employed, the receiver (or the Rx beam(s)) of the bistatic radar system may be configured to chase the RRS (or pulse) probates from the corresponding transmitter of the bistatic radar system, which may be referred to as "pulse chasing." For example, the receiver may use a Rx beam to rapidly scan the volume/area covered by the Tx beam.

As such, when non-RF sensing and/or non-RF measurements are used for assisting Tx/Rx beam configuration for an RF sensing node, such as a bistatic radar, it may be easier for a receiver to perform the pulse chasing if the location, direction, incident angle, and/or reflect angle of a target object can be determined based on non-RF measurements.

Figure 12:
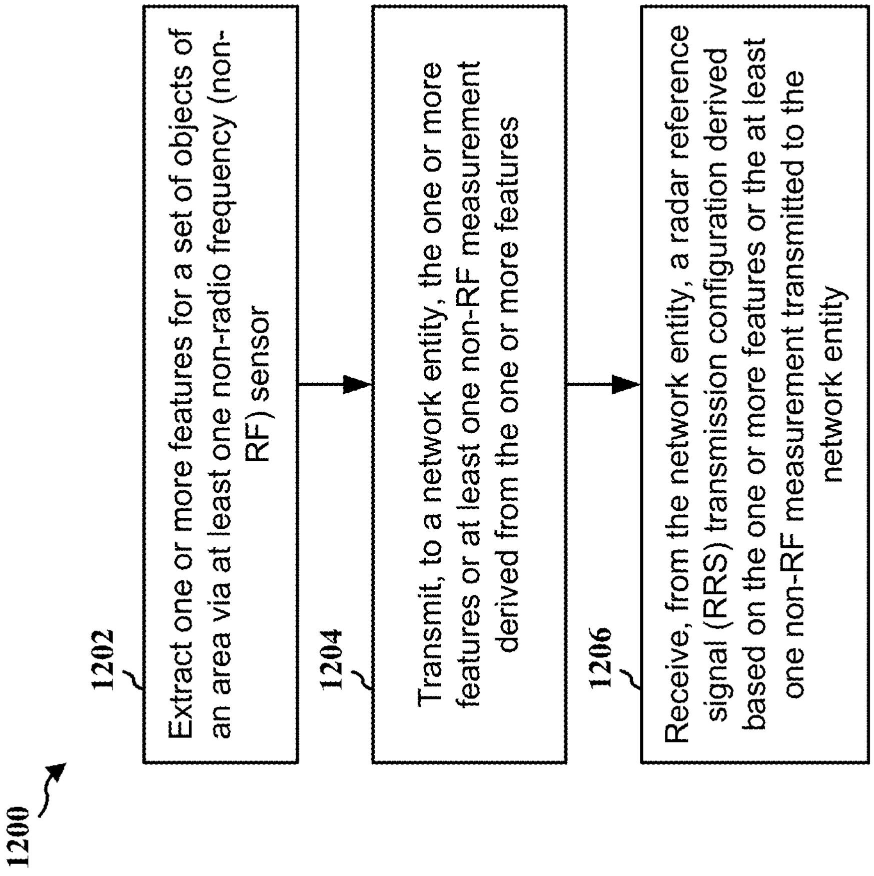
FIG. 12 is a flowchart of a method of wireless communication in accordance with aspects presented herein.

FIG. 12 is a flowchart 1200 of a method of wireless communication. The method may be performed by an RF sensing node or a component of an RF sensing node (e.g., the RF sensing node 703, 802; the base station 102, 180, 310; the UE 104, 350, 404, 602; the TRP 402, 604, 606, 608, 610; the apparatus 1302). The method may enable the RF sensing node to transmit RRS based at least in part on environmental conditions to improve the performance and the accuracy of RF sensing.

At 1202, the RF sensing node may extract one or more features for a set of objects of an area via at least one non-RF sensor, such as described in connection with FIGS. 8 and 9. For example, at 816, the RF sensing node 802 may extract feature(s) 806 for one or more objects 808 of an area via at least one non-RF sensor 810. The extraction of one or more features for a set of objects may be performed by, e.g., the feature extraction component 1340 of the apparatus 1302 in FIG. 13.

In one example, the RF sensing node may be a base station or a UE, and the network entity may be a server for sensing (or may be referred to as a sensing server).

In another example, the at least one non-RF sensor may include one or more of: a camera, an ultra-sound sensor, a lidar sensor, or a barometric sensor.

In another example, the one or more features for the set of objects may include an RCS of an object, a size of the object, a shape of the object, a classification of the object, a material of the object, an orientation of the object, a location of the object, a speed of the object, or a combination thereof.

At 1204, the RF sensing node may transmit, to a network entity, the one or more features or at least one non-RF measurement derived from the one or more features, such as described in connection with FIG. 8. For example, at 820, the RF sensing node 802 may transmit, to the network entity 804, the extracted features 806 or the non-RF measurements 812 that are derived from the extracted features 806. The transmission of the one or more features or the at least one non-RF measurement may be performed by, e.g., the feature/non-RF measurement report component 1342 and/or the transmission component 1334 of the apparatus 1302 in FIG. 13.

In one example, the one or more features for the set of objects or the at least one non-RF measurement derived from the one or more features may be processed by an AI processor of the RF sensing node.

At 1206, the RF sensing node may receive, from the network entity, an RRS transmission configuration derived based on the one or more features or the at least one non-RF measurement transmitted to the network entity, such as described in connection with FIG. 8. For example, at 826, the RF sensing node 802 may receive, from the network entity 804, an RRS transmission configuration 814 that is derived based on the extracted features 806 or the non-RF measurement 812. The reception of the RRS transmission configuration may be performed by, e.g., the RRS transmission process component 1344 and/or the reception component 1330 of the apparatus 1302 in FIG. 13.

In one example, the RRS transmission configuration may include a transmission power for one or more antennas of the RF sensing node for transmitting an RRS, a number of transmission antennas for transmitting the RRS, a periodicity for transmitting the RRS, an RRS repetition factor associated with transmitting the RRS, or a combination thereof.

In another example, the RF sensing node may receive, from the network entity, a CP duration configuration for a CP-OFDM waveform based on the one or more features or the at least one non-RF measurement transmitted to the network entity.

In another example, the RF sensing node may receive, from the network entity, a resource allocation for transmitting an RRS based on the one or more features or the at least one non-RF measurement transmitted to the network entity.

In another example, the RF sensing node may receive, from the network entity, a beam configuration for transmitting an RRS or receiving a reflected RRS based on the one or more features or the at least one non-RF measurement transmitted to the network entity.

In another example, the RF sensing node may transmit, towards the area, one or more RRSs based on the RRS transmission configuration.

Figure 13:
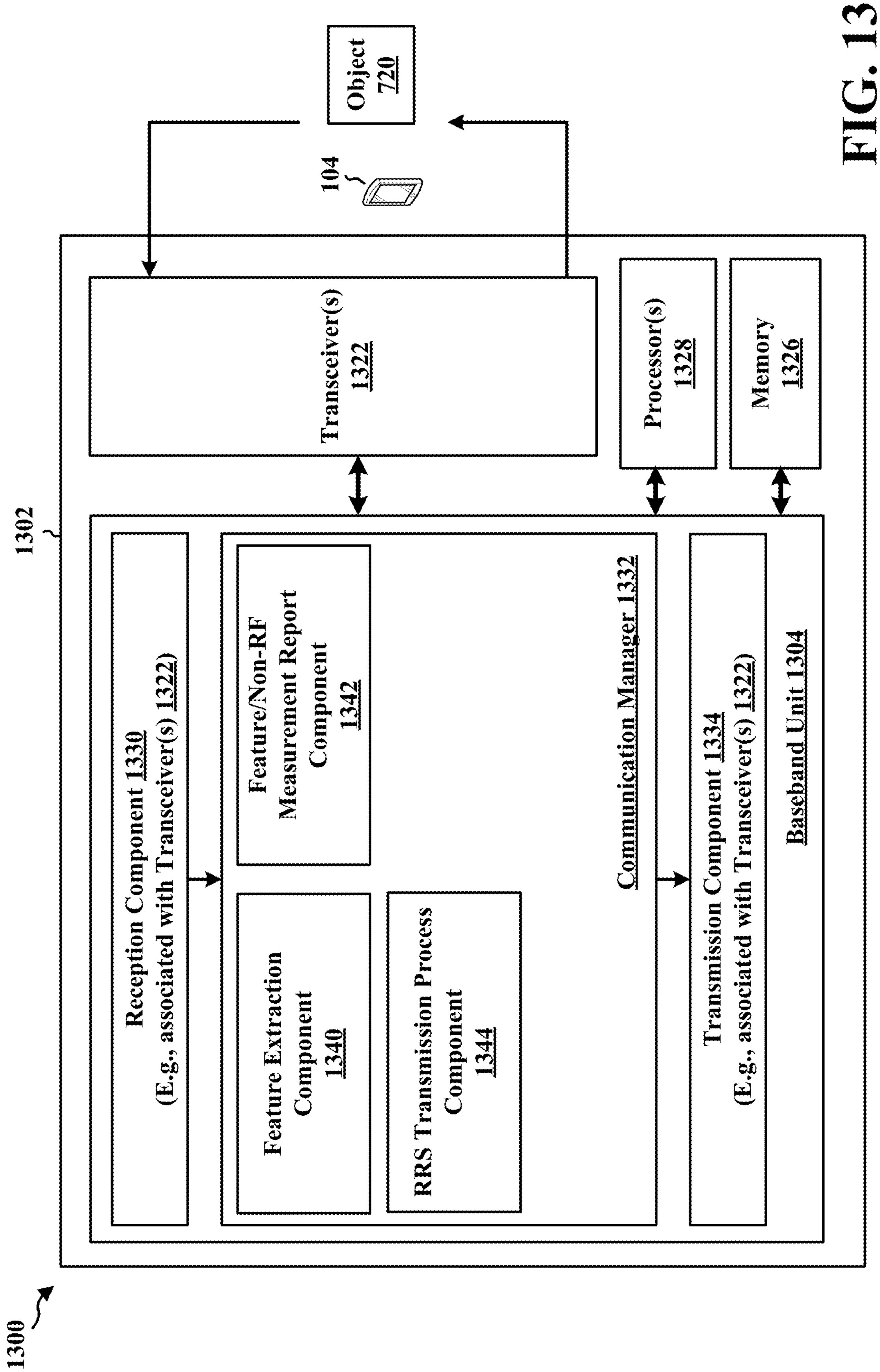
FIG. 13 is a diagram illustrating an example of a hardware implementation for an example apparatus in accordance with aspects presented herein.

FIG. 13 is a diagram 1300 illustrating an example of a hardware implementation for an apparatus 1302. The apparatus 1302 may be an RF sensing node, a component of an RF sensing node, or may implement RF sensing node functionality. In some aspects, the apparatus 1302 may include a baseband unit 1304. The baseband unit 1304 may communicate through at least one transceiver 1322 (e.g., one or more RF transceivers and/or antennas) with the UE 104 or with an object 720 (e.g., an object that receives and/or bounce off RF sensing signals). The at least one transceiver 1322 may be associated with or include a reception component 1330 and/or a transmission component 1334. The baseband unit 1304 may include a computer-readable medium/memory (e.g., a memory 1326). The baseband unit 1304 and/or the at least one processor 1328 may be responsible for general processing, including the execution of software stored on the computer-readable medium/memory. The software, when executed by the baseband unit 1304 and/or the at least one processor 1328, causes the baseband unit 1304 and/or the at least one processor 1328 to perform the various functions described supra. The computer-readable medium/memory may also be used for storing data that is manipulated by the baseband unit 1304 when executing software. The baseband unit 1304 further includes the reception component 1330, a communication manager 1332, and the transmission component 1334. The reception component 1330 and the transmission component 1334 may, in a non-limiting example, include at least one transceiver and/or at least one antenna subsystem. The communication manager 1332 includes the one or more illustrated components. The components within the communication manager 1332 may be stored in the computer-readable medium/memory and/or configured as hardware within the baseband unit 1304. The baseband unit 1304 may be a component of the RF sensing node and may include the memory 376 and/or at least one of the TX processor 316, the RX processor 370, and the controller/processor 375.

The communication manager 1332 includes a feature extraction component 1340 that may be configured to extract one or more features for a set of objects of an area via at least one non-RF sensor, e.g., as described in connection with 1202 of FIG. 12. The communication manager 1332 further includes a feature/non-RF measurement report component 1342 that may be configured to transmit, to a network entity, the one or more features or at least one non-RF measurement derived from the one or more features, e.g., as described in connection with 1204 of FIG. 12. The communication manager 1332 further includes an RRS transmission process component 1344 that may be configured to receive, from the network entity, an RRS transmission configuration derived based on the one or more features or the at least one non-RF measurement transmitted to the network entity, e.g., as described in connection with 1206 of FIG. 12.

The apparatus may include additional components that perform each of the blocks of the algorithm in the flowchart of FIG. 12. As such, each block in the flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for extracting one or more features for a set of objects of an area via at least one non-RF sensor (e.g., the feature extraction component 1340). The apparatus 1302 includes means for transmitting, to a network entity, the one or more features or at least one non-RF measurement derived from the one or more features (e.g., the feature/non-RF measurement report component 1342 and/or the transmission component 1334). The apparatus 1302 includes means for receiving, from the network entity, an RRS transmission configuration derived based on the one or more features or the at least one non-RF measurement transmitted to the network entity (e.g., the RRS transmission process component 1344 and/or the reception component 1330).

In one configuration, the RF sensing node may be a base station or a UE, and the network entity may be a server for sensing.

In another configuration, the at least one non-RF sensor may include one or more of: a camera, an ultra-sound sensor, a lidar sensor, or a barometric sensor.

In another configuration, the one or more features for the set of objects may include an RCS of an object, a size of the object, a shape of the object, a classification of the object, a material of the object, an orientation of the object, a location of the object, a speed of the object, or a combination thereof.

In another configuration, the one or more features for the set of objects or the at least one non-RF measurement derived from the one or more features may be processed by an AI processor of the RF sensing node.

In another configuration, the RRS transmission configuration may a transmission power for one or more antennas of the RF sensing node for transmitting an RRS, a number of transmission antennas for transmitting the RRS, a periodicity for transmitting the RRS, an RRS repetition factor associated with transmitting the RRS, or a combination thereof.

In another configuration, the apparatus 1302 includes means for receiving, from the network entity, a CP duration configuration for a CP-OFDM waveform based on the one or more features or the at least one non-RF measurement transmitted to the network entity.

In another configuration, the apparatus 1302 includes means for receiving, from the network entity, a resource allocation for transmitting an RRS based on the one or more features or the at least one non-RF measurement transmitted to the network entity.

In another configuration, the apparatus 1302 includes means for receiving, from the network entity, a beam configuration for transmitting an RRS or receiving a reflected RRS based on the one or more features or the at least one non-RF measurement transmitted to the network entity.

In another configuration, the apparatus 1302 includes means for transmitting, towards the area, one or more RRSs based on the RRS transmission configuration.

The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 14:
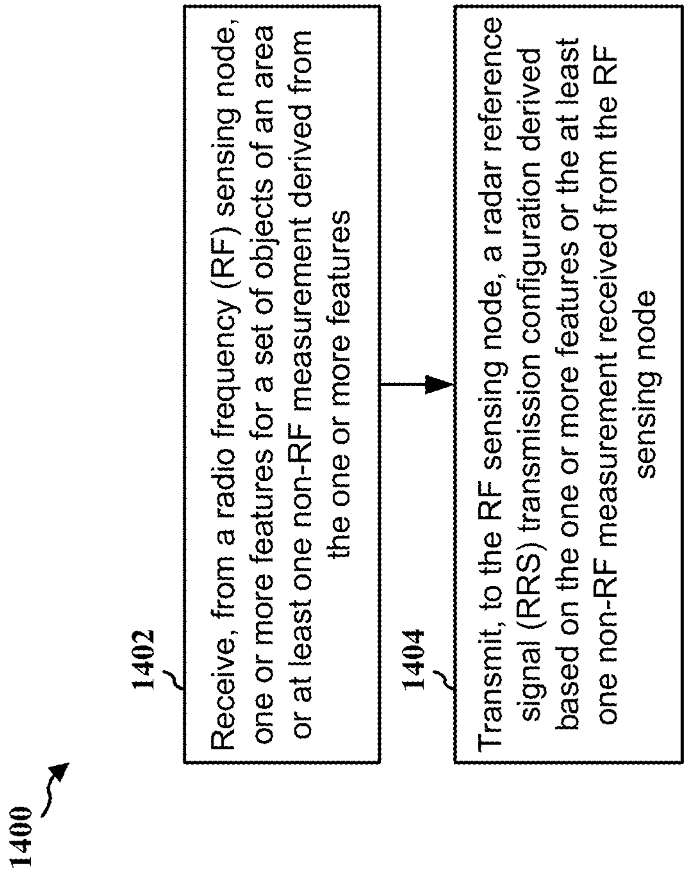
FIG. 14 is a flowchart of a method of wireless communication in accordance with aspects presented herein.

FIG. 14 is a flowchart 1400 of a method of wireless communication. The method may be performed by a network entity or a component of a network entity (e.g., the network entity 804). The method may enable the network entity to configure RRS transmission for an RF sensing node based at least in part on environmental conditions around the RF sensing node to improve the performance and the accuracy of RF sensing.

At 1402, the network entity may receive, from an RF sensing node, one or more features for a set of objects of an area or at least one non-RF measurement derived from the one or more features, such as described in connection with FIG. 8. For example, at 820, the network entity 804 may receive, from the RF sensing node 802, extracted features 806 for one or more objects 808 of an area or at least one non-RF measurement 812 derived based on the extracted features 806. The reception of the one or more features or the at least one non-RF measurement may be performed by, e.g., the feature/non-RF measurement process component 1540 and/or the reception component 1530 of the apparatus 1502 in FIG. 15.

In one example, the RF sensing node may be a base station or a UE, and the network entity may be a server for sensing.

In another example, the one or more features for the set of objects may include an RCS of an object, a size of the object, a shape of the object, a classification of the object, a material of the object, an orientation of the object, a location of the object, a speed of the object, or a combination thereof.

At 1404, the network entity may transmit, to the RF sensing node, an RRS transmission configuration derived based on the one or more features or the at least one non-RF measurement received from the RF sensing node, such as described in connection with FIG. 8. For example, at 826, the network entity 804 may transmit, to the RF sensing node 802, an RRS transmission configuration 814 that is derived based on the extracted features 806 or the non-RF measurement 812 received from the RF sensing node 802. The transmission of the RRS transmission configuration may be performed by, e.g., the RRS configuration component 1542 and/or the transmission component 1534 of the apparatus 1502 in FIG. 15.

In one example, the RRS transmission configuration may include a transmission power for one or more antennas of the RF sensing node for transmitting an RRS, a number of transmission antennas for transmitting the RRS, an RRS repetition factor associated with transmitting the RRS, or a combination thereof.

In another example, the network entity may transmit, to the RF sensing node, a CP duration configuration for a CP-OFDM waveform based on the one or more features or the at least one non-RF measurement received from the RF sensing node.

In another example, the network entity may transmit, to the RF sensing node, a resource allocation for transmitting an RRS based on the one or more features or the at least one non-RF measurement received from the RF sensing node.

In another example, the network entity may transmit, to the RF sensing node, a beam configuration for transmitting an RRS or receiving a reflected RRS based on the one or more features or the at least one non-RF measurement received from the RF sensing node.

In another example, the network entity may derive RCS measurements for the set of objects of the area based on the one or more features or the at least one non-RF measurement received from the RF sensing node, where the RRS transmission configuration is further based on the RCS measurements for the set of objects.

Figure 15:
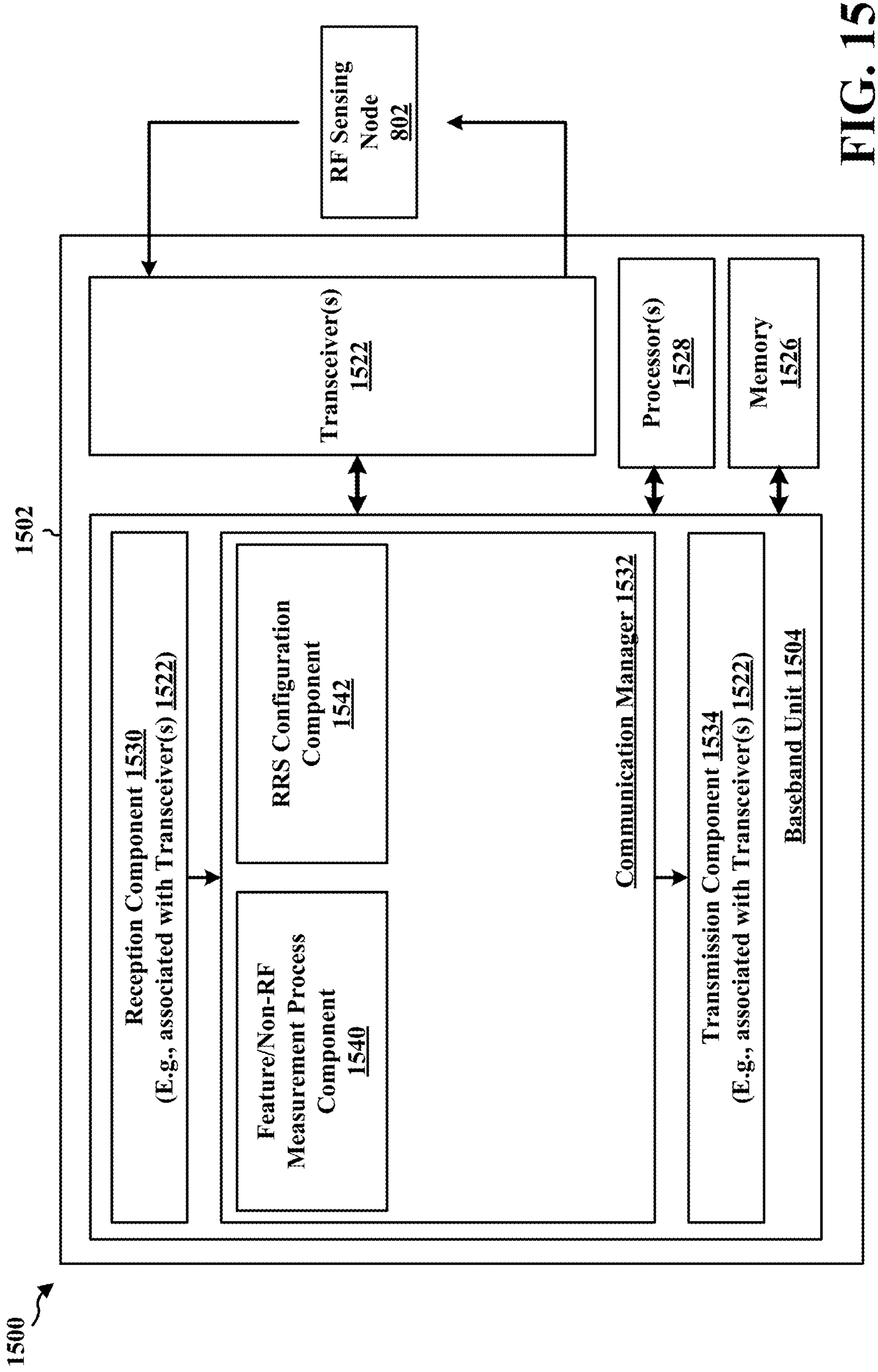
FIG. 15 is a diagram illustrating an example of a hardware implementation for an example apparatus in accordance with aspects presented herein.

FIG. 15 is a diagram 1500 illustrating an example of a hardware implementation for an apparatus 1502. The apparatus 1502 may be a network entity (e.g., a location server, an LMF, etc.), a component of a network entity, or may implement the network entity functionality. In some aspects, the apparatus 1502 may include a baseband unit 1504. The baseband unit 1504 may communicate through at least one transceiver 1522 (e.g., one or more RF transceivers and/or antennas) with the RF sensing node 802 (e.g., which may be UE 104 or base station 102/180). The at least one transceiver 1522 may be associated with or include a reception component 1530 and/or a transmission component 1534. The baseband unit 1504 may include a computer-readable medium/memory (e.g., a memory 1526). The baseband unit 1504 and/or the at least one processor 1528 may be responsible for general processing, including the execution of software stored on the computer-readable medium/memory. The software, when executed by the baseband unit 1504 and/or the at least one processor 1528, causes the baseband unit 1504 and/or the at least one processor 1528 to perform the various functions described supra. The computer-readable medium/memory may also be used for storing data that is manipulated by the baseband unit 1504 when executing software. The baseband unit 1504 further includes the reception component 1530, a communication manager 1532, and the transmission component 1534. The reception component 1530 and the transmission component 1534 may, in a non-limiting example, include at least one transceiver and/or at least one antenna subsystem. The communication manager 1532 includes the one or more illustrated components. The components within the communication manager 1532 may be stored in the computer-readable medium/memory and/or configured as hardware within the baseband unit 1504. The baseband unit 1504 may be a component of the network entity and may include the memory 376 and/or at least one of the TX processor 316, the RX processor 370, and the controller/processor 375.

The communication manager 1532 includes a feature/non-RF measurement process component 1540 that may be configured to receive, from an RF sensing node, one or more features for a set of objects of an area or at least one non-RF measurement derived from the one or more features, e.g., as described in connection with 1402 of FIG. 14. The communication manager 1532 further includes an RRS configuration component 1542 that may be configured to transmit, to the RF sensing node, an RRS transmission configuration derived based on the one or more features or the at least one non-RF measurement received from the RF sensing node, e.g., as described in connection with 1404 of FIG. 14.

The apparatus may include additional components that perform each of the blocks of the algorithm in the flowchart of FIG. 14. As such, each block in the flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for receiving, from an RF sensing node, one or more features for a set of objects of an area or at least one non-RF measurement derived from the one or more features (e.g., the feature/non-RF measurement process component 1540 and/or the reception component 1530). The apparatus 1502 includes means for transmitting, to the RF sensing node, an RRS transmission configuration derived based on the one or more features or the at least one non-RF measurement received from the RF sensing node (e.g., the RRS configuration component 1542 and/or the transmission component 1534).

In one configuration, the RF sensing node may be a base station or a UE, and the network entity may be a server for sensing.

In another configuration, the one or more features for the set of objects may include an RCS of an object, a size of the object, a shape of the object, a classification of the object, a material of the object, an orientation of the object, a location of the object, a speed of the object, or a combination thereof.

In another configuration, the RRS transmission configuration may include a transmission power for one or more antennas of the RF sensing node for transmitting an RRS, a number of transmission antennas for transmitting the RRS, an RRS repetition factor associated with transmitting the RRS, or a combination thereof.

In another configuration, the apparatus 1502 includes means for transmitting, to the RF sensing node, a CP duration configuration for a CP-OFDM waveform based on the one or more features or the at least one non-RF measurement received from the RF sensing node.

In another configuration, the apparatus 1502 includes means for transmitting, to the RF sensing node, a resource allocation for transmitting an RRS based on the one or more features or the at least one non-RF measurement received from the RF sensing node.

In another configuration, the apparatus 1502 includes means for transmitting, to the RF sensing node, a beam configuration for transmitting an RRS or receiving a reflected RRS based on the one or more features or the at least one non-RF measurement received from the RF sensing node.

In another configuration, the apparatus 1502 includes means for deriving RCS measurements for the set of objects of the area based on the one or more features or the at least one non-RF measurement received from the RF sensing node, where the RRS transmission configuration is further based on the RCS measurements for the set of objects.

The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including a memory; at least one transceiver; and at least one processor communicatively connected to the memory and the at least one transceiver, the at least one processor configured to: extract one or more features for a set of objects of an area via at least one non-RF sensor; transmit, to a network entity, the one or more features or at least one non-RF measurement derived from the one or more features; and receive, from the network entity, an RRS transmission configuration derived based on the one or more features or the at least one non-RF measurement transmitted to the network entity.

Aspect 2 is the apparatus of aspect 1, where the RF sensing node is a base station or a UE and the network entity is a server for sensing.

Aspect 3 is the apparatus of any of aspects 1 and 2, where the at least one non-RF sensor includes one or more of: a camera, an ultra-sound sensor, a lidar sensor, or a barometric sensor.

Aspect 4 is the apparatus of any of aspects 1 to 3, where the one or more features for the set of objects include an RCS of an object, a size of the object, a shape of the object, a classification of the object, a material of the object, an orientation of the object, a location of the object, a speed of the object, or a combination thereof.

Aspect 5 is the apparatus of any of aspects 1 to 4, where the RRS transmission configuration includes a transmission power for one or more antennas of the RF sensing node for transmitting an RRS, a number of transmission antennas for transmitting the RRS, a periodicity for transmitting the RRS, an RRS repetition factor associated with transmitting the RRS, or a combination thereof.

Aspect 6 is the apparatus of any of aspects 1 to 5, where the one or more features for the set of objects or the at least one non-RF measurement derived from the one or more features is processed by an AI processor of the RF sensing node.

Aspect 7 is the apparatus of any of aspects 1 to 6, where the at least one processor is further configured to: receive, from the network entity, a CP duration configuration for a CP-OFDM waveform based on the one or more features or the at least one non-RF measurement transmitted to the network entity.

Aspect 8 is the apparatus of any of aspects 1 to 7, where the at least one processor is further configured to: receive, from the network entity, a resource allocation for transmitting an RRS based on the one or more features or the at least one non-RF measurement transmitted to the network entity.

Aspect 9 is the apparatus of any of aspects 1 to 8, where the at least one processor is further configured to: receive, from the network entity, a beam configuration for transmitting an RRS or receiving a reflected RRS based on the one or more features or the at least one non-RF measurement transmitted to the network entity.

Aspect 10 is the apparatus of any of aspects 1 to 9, where the at least one processor is further configured to: transmit, towards the area, one or more RRSs based on the RRS transmission configuration.

Aspect 11 is a method of wireless communication for implementing any of aspects 1 to 10.

Aspect 12 is an apparatus for wireless communication including means for implementing any of aspects 1 to 10.

Aspect 13 is a computer-readable medium storing computer executable code, where the code when executed by a processor causes the processor to implement any of aspects 1 to 10.

Aspect 14 is an apparatus for wireless communication including a memory; at least one transceiver; and at least one processor communicatively connected to the memory and the at least one transceiver, the at least one processor configured to: receive, from an RF sensing node, one or more features for a set of objects of an area or at least one non-RF measurement derived from the one or more features; and transmit, to the RF sensing node, an RRS transmission configuration derived based on the one or more features or the at least one non-RF measurement received from the RF sensing node.

Aspect 15 is the apparatus of aspect 14, where the RF sensing node is a base station or a UE and the network entity is a server for sensing.

Aspect 16 is the apparatus of any of aspects 14 and 15, where the one or more features for the set of objects include an RCS of an object, a size of the object, a shape of the object, a classification of the object, a material of the object, an orientation of the object, a location of the object, a speed of the object, or a combination thereof.

Aspect 17 is the apparatus of any of aspects 14 to 16, where the RRS transmission configuration includes a transmission power for one or more antennas of the RF sensing node for transmitting an RRS, a number of transmission antennas for transmitting the RRS, an RRS repetition factor associated with transmitting the RRS, or a combination thereof.

Aspect 18 is the apparatus of any of aspects 14 to 17, where the at least one processor is further configured to: transmit, to the RF sensing node, a CP duration configuration for a CP-OFDM waveform based on the one or more features or the at least one non-RF measurement received from the RF sensing node.

Aspect 19 is the apparatus of any of aspects 14 to 18, where the at least one processor is further configured to: transmit, to the RF sensing node, a resource allocation for transmitting an RRS based on the one or more features or the at least one non-RF measurement received from the RF sensing node.

Aspect 20 is the apparatus of any of aspects 14 to 19, where the at least one processor is further configured to: transmit, to the RF sensing node, a beam configuration for transmitting an RRS or receiving a reflected RRS based on the one or more features or the at least one non-RF measurement received from the RF sensing node.

Aspect 21 is the apparatus of any of aspects 14 to 20, where the at least one processor is further configured to: derive RCS measurements for the set of objects of the area based on the one or more features or the at least one non-RF measurement received from the RF sensing node, where the RRS transmission configuration is further based on the RCS measurements for the set of objects.

Aspect 22 is a method of wireless communication for implementing any of aspects 14 to 21.

Aspect 23 is an apparatus for wireless communication including means for implementing any of aspects 14 to 21.

Aspect 24 is a computer-readable medium storing computer executable code, where the code when executed by a processor causes the processor to implement any of aspects 14 to 21.

What is claimed is:

1. An apparatus for wireless communication at a radio frequency (RF) sensing node, comprising:
- at least one memory;
- at least one transceiver; and
- at least one processor communicatively connected to the at least one memory and the at least one transceiver, wherein the at least one processor is configured to:
  - detect there is a non-line of sight (NLOS) channel condition or a potential NLOS channel condition for radio frequency (RF) sensing of an object;
  - estimate at least one of a location of the object, an incident angle of the object, or a reflected angle of the object using at least one non-RF sensor based on the detection of the NLOS channel condition or the potential NLOS channel condition for the RF sensing of the object;
  - transmit, to a network entity, an indication of at least one of the location of the object, the incident angle of the object, or the reflected angle of the object;
  - receive, from the network entity, a beamforming configuration for the RF sensing based on at least one of the location of the object, the incident angle of the object, or the reflected angle of the object; and
  - perform the RF sensing based on the beamforming configuration.

2. The apparatus of claim 1, wherein estimation of at least one of the location of the object, the incident angle of the object, or the reflected angle of the object using the at least one non-RF sensor is processed by an artificial intelligent (AI) processor of the RF sensing node.

3. The apparatus of claim 1, wherein the at least one non-RF sensor corresponds to at least one camera.

4. The apparatus of claim 1, wherein to perform the RF sensing based on the beamforming configuration, the at least one processor is configured to at least one of:
- transmit, for the RF sensing, a first set of reference signals (RSS) via at least one transmission (Tx) beam that is beamformed based on the beamforming configuration, or
- receive, for the RF sensing, a second set of RSs via at least one reception (Rx) beam that is beamformed based on the beamforming configuration.

5. The apparatus of claim 1, wherein the beamforming configuration configures at least one of a transmission (Tx) beam or a reception (Rx) beam of the RF sensing node.

6. The apparatus of claim 1, wherein the at least one processor is further configured to:
- estimate a distance between the RF sensing node and the object based on the RF sensing.

7. The apparatus of claim 1, wherein the at least one processor is further configured to:
- receive, from the network entity, a resource allocation for performing the RF sensing.

8. The apparatus of claim 1, wherein the RF sensing node is a base station or a component of the base station.

9. A method for wireless communication at a radio frequency (RF) sensing node, comprising:
- detecting there is a non-line of sight (NLOS) channel condition or a potential NLOS channel condition for radio frequency (RF) sensing of an object;
- estimating at least one of a location of the object, an incident angle of the object, or a reflected angle of the object using at least one non-RF sensor based on the detection of the NLOS channel condition or the potential NLOS channel condition for the RF sensing of the object;
- transmitting, to a network entity, an indication of at least one of the location of the object, the incident angle of the object, or the reflected angle of the object;
- receiving, from the network entity, a beamforming configuration for the RF sensing based on at least one of the location of the object, the incident angle of the object, or the reflected angle of the object; and
- performing the RF sensing based on the beamforming configuration.

10. The method of claim 9, wherein estimation of at least one of the location of the object, the incident angle of the object, or the reflected angle of the object using the at least one non-RF sensor is processed by an artificial intelligent (AI) processor of the RF sensing node.

11. The method of claim 9, wherein the at least one non-RF sensor corresponds to at least one camera.

12. The method of claim 9, wherein performing the RF sensing based on the beamforming configuration comprises:
- transmitting, for the RF sensing, a first set of reference signals (RSs) via at least one transmission (Tx) beam that is beamformed based on the beamforming configuration, or
- receiving, for the RF sensing, a second set of RSs via at least one reception (Rx) beam that is beamformed based on the beamforming configuration.

13. The method of claim 9, wherein the beamforming configuration configures at least one of a transmission (Tx) beam or a reception (Rx) beam of the RF sensing node.

14. The method of claim 9, further comprising:

estimating a distance between the RF sensing node and the object based on the RF sensing.

15. The method of claim 9, further comprising:

receiving, from the network entity, a resource allocation for performing the RF sensing.

16. An apparatus for wireless communication at a radio frequency (RF) sensing node, comprising:

at least one memory;

at least one transceiver; and at least one processor communicatively connected to the at least one memory and the at least one transceiver, wherein the at least one processor is configured to:

detect there is a non-line of sight (NLOS) channel condition or a potential NLOS channel condition for radio frequency (RF) sensing of an object;

estimate at least one of a location of the object, an incident angle of the object, or a reflected angle of the object using at least one non-RF sensor based on the detection of the NLOS channel condition or the potential NLOS channel condition for the RF sensing of the object;

configure a beamforming configuration for the RF sensing based on at least one of the location of the object, the incident angle of the object, or the reflected angle of the object; and perform the RF sensing based on the beamforming configuration.

* * * * *